United States Patent
Wakida et al.

(10) Patent No.: US 10,333,187 B2
(45) Date of Patent: Jun. 25, 2019

(54) SECONDARY BATTERY

(71) Applicant: NGK INSULATORS, LTD., Nagoya (JP)

(72) Inventors: Keiichi Wakida, Obu (JP); Koji Hoshino, Nagoya (JP); Shinichiro Osaka, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 555 days.

(21) Appl. No.: 15/095,278

(22) Filed: Apr. 11, 2016

(65) Prior Publication Data
US 2016/0226115 A1 Aug. 4, 2016

Related U.S. Application Data

(63) Continuation of application No. PCT/JP2014/077542, filed on Oct. 16, 2014.

(30) Foreign Application Priority Data

Oct. 17, 2013 (JP) .................. 2013-216123

(51) Int. Cl.
*H01M 10/6556* (2014.01)
*H01M 10/6563* (2014.01)
(Continued)

(52) U.S. Cl.
CPC ..... *H01M 10/6556* (2015.04); *H01M 2/1016* (2013.01); *H01M 10/39* (2013.01); *H01M 10/3909* (2013.01); *H01M 10/613* (2015.04); *H01M 10/653* (2015.04); *H01M 10/658* (2015.04); *H01M 10/6551* (2015.04); *H01M 10/6563* (2015.04); *H01M 2/1094* (2013.01); *H01M 10/615* (2015.04)

(58) Field of Classification Search
None
See application file for complete search history.

(56) References Cited

U.S. PATENT DOCUMENTS 3,758,337 A  9/1973 Fally et al.
5,800,942 A * 9/1998 Hamada .................. B60K 1/04
429/120

(Continued)

FOREIGN PATENT DOCUMENTS

JP  2004-055373 A  2/2004
JP  2008-257960 A  10/2008
(Continued)

OTHER PUBLICATIONS

International Search Report and Written Opinion, International Application No. PCT/JP2014/077542, dated Dec. 9, 2014 (10 pages).

(Continued)

Primary Examiner — Rena Dye Cronin
(74) Attorney, Agent, or Firm — Burr & Brown, PLLC

(57) ABSTRACT

A secondary battery has: a box body having a heat insulating structure, the box body having an opening on the upper surface thereof and an assembled battery housed therein; a lid body having a heat insulating structure, the lid body sealing the opening of the box body; and a duct which is installed at least between the box body and the lid body and inside which a fluid circulates.

14 Claims, 13 Drawing Sheets

(51) Int. Cl.
*H01M 10/658* (2014.01)
*H01M 10/39* (2006.01)
*H01M 10/653* (2014.01)
*H01M 10/6551* (2014.01)
*H01M 2/10* (2006.01)
*H01M 10/613* (2014.01)
H01M 10/615 (2014.01)

(56) References Cited

U.S. PATENT DOCUMENTS

| | | | |
|---|---|---|---|
| 8,568,532 B2 * | 10/2013 | Iwai | C30B 9/10 117/200 |
| 2008/0247135 A1 | 10/2008 | Inoue et al. | |
| 2011/0104547 A1 | 5/2011 | Saito et al. | |
| 2013/0052505 A1 * | 2/2013 | Murasato | H01M 10/63 429/99 |
| 2013/0216884 A1 * | 8/2013 | Takasaki | H01M 2/1077 429/99 |
| 2014/0308545 A1 * | 10/2014 | Tamakoshi | H01M 10/3909 429/50 |

FOREIGN PATENT DOCUMENTS

| | | |
|---|---|---|
| JP | 2011-096478 A | 5/2011 |
| WO | 2011/142199 A1 | 11/2011 |
| WO | 2013/111426 A1 | 8/2013 |

OTHER PUBLICATIONS

Extended European Search Report, European Application No. 14853550, dated Feb. 24, 2017 (8 pages).

* cited by examiner

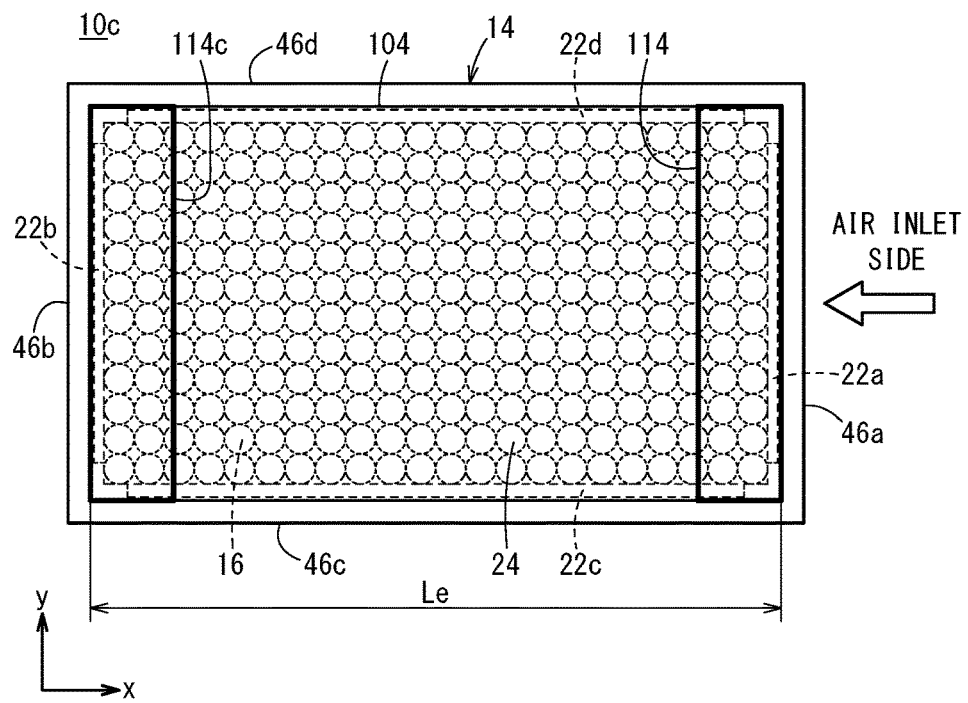
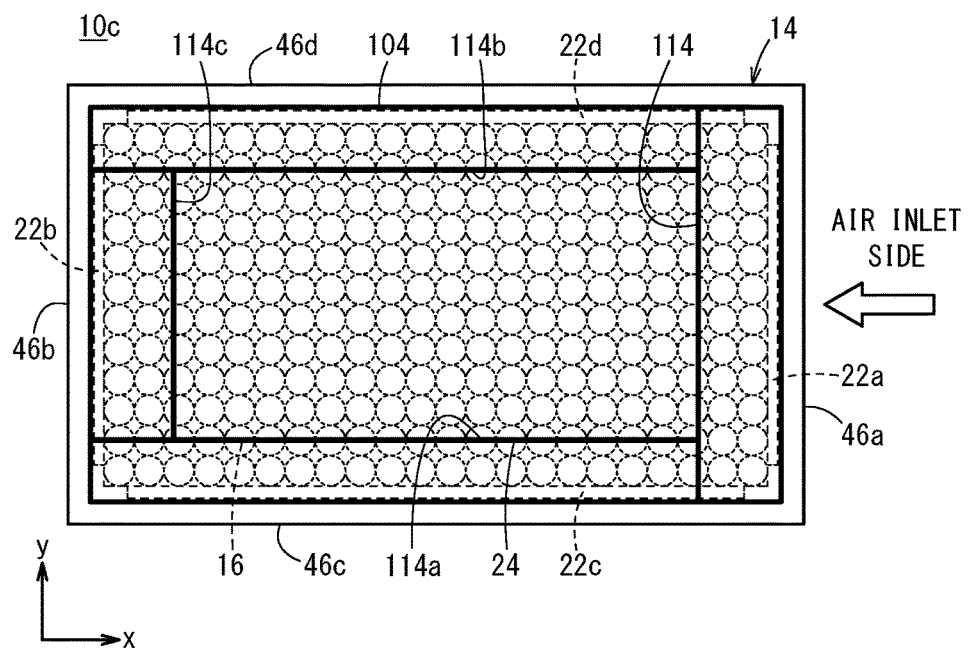

SECONDARY BATTERY

CROSS-REFERENCE TO RELATED APPLICATIONS

This application is a Continuation of International Application No. PCT/JP2014/077542 filed on Oct. 16, 2014, which is based upon and claims the benefit of priority from Japanese Patent Application No. 2013-216123 filed on Oct. 17, 2013, the contents all of which are incorporated herein by reference.

TECHNICAL FIELD

The present invention relates to a secondary battery having a cooling apparatus.

BACKGROUND ART

In general, frequency adjustment in an electric power system and adjustment of power demands and power supplies in the electric power system are carried out using a plurality of power generators, storage batteries, etc., equipped in the electric power system. Further, in most cases, adjustment in the difference between the generated electric power from natural energy based power generators and its planned output electric power, and reduction in the changes of electric power generated by the natural energy based power generators are also performed using the power generators, storage batteries, etc. In comparison with general electric power generators, the storage batteries can change the electric power output at high speed, and can be used effectively in frequency adjustment of the electric power system, adjustment of the difference between the generated electric power from natural energy based power generators and its planned output electric power, and adjustment of power demands and power supplies in the electric power system.

In this regard, as a storage battery operated at high temperature connected to the electric power system, a sodium-sulfur battery (hereinafter referred to as the NaS battery) is used, for example. This NaS battery is a secondary battery containing metal sodium and sulfur as active materials in an isolated manner using a solid electrolyte tube. When the NaS battery is heated at high temperature of about 300° C., a certain amount of energy is generated by an electrochemical reaction of both of the melted active materials of these metal sodium and sulfur. Normally, the NaS battery is formed by assembling a plurality of battery cells upright, and used in a form of a module battery including a plurality of battery cells connected together. That is, the module battery has structure where circuits (strings) each formed by connecting a plurality of battery cells in series are connected in parallel to form a block, and at least two blocks are connected in series, and placed in a heat insulating container.

In use of the NaS battery, a plurality of heat insulating containers are stacked (in stages) to form one module string, and a plurality of the module strings are arranged in parallel to form one package. A control device for controlling each module battery of the package is provided (for example, see Japanese Laid-Open Patent Publication No. 2004-055373).

According to the disclosure of Japanese Laid-Open Patent Publication No. 2004-055373, as a method of adjusting the temperature in a package, an air intake opening connected to the outside is provided in a lower portion or a side portion of the package, an exhaust opening connected to the outside is provided in an upper portion of the package, and the opening ratio of the exhaust opening is changed.

SUMMARY OF INVENTION

In the case where the load on the electric power system is high, e.g., in summer season or in winter season, since the electric discharge output is high or the electric discharge time period is long, the amount of heat generated in the NaS battery may exceed the heat loss of the vacuum heat insulating container containing the NaS battery, and heat may be accumulated in the vacuum heat insulating container undesirably. If heat is accumulated due to the imbalance between the heat generation and the heat loss, the internal temperature of the heat insulating container of the NaS battery is increased excessively. If the temperature exceeds 360° C. while the NaS battery has battery capacity, malfunction may occur disadvantageously. In this regard, for example, it may be considered to adopt vacuum heat insulating structure for the box body containing the battery assembly, and adopt atmospheric heat insulating structure for the lid body closing the opening of the box body, to avoid heat accumulation in the heat insulating container.

On the other hand, in the case where the load on the electric power system is low, e.g., in spring season or in autumn season, and for example, at the time of leveling power generation such as wind force power generation, since the electric discharge time period is short, the amount of heat generated in the NaS battery may drop below the heat loss of the heat insulating container. In this case, in order to keep operation of the NaS battery in the desired state, energy consumption of the heater used for maintaining the temperature of the battery module may become excessive. If energy consumption of the heater becomes excessive, the charging/discharging efficiency representing the ratio of the amount of discharging electric energy to the amount of consumed electrical energy of the NaS battery (amount of charging electrical energy+ amount of heater electrical energy) is degraded undesirably. In this regard, it may be considered to adopt vacuum heat insulating structure for both of the box body and the lid body of the heat insulating container, and utilize the accumulated heat in the heat insulating container to suppress degradation in the charging/discharging efficiency.

As described above, for the optimum operation of the secondary battery, it may be considered to change the heat insulating structure of the heat insulating container depending on the level of the load. However, adoption of such a scheme for every heat insulating container is difficult, and unrealistic.

The present invention has been made to take the problems of this type into account, and an object of the present invention is to provide a secondary battery which makes it possible to perform optimum operation without changing physical heat insulating structure of the heat insulating container depending on the level of the load.

[1] A secondary apparatus according to the present invention includes a box body, a lid body, and a duct. The box body has heat insulating structure. An opening is formed in an upper surface of the box body. The box body contains a battery assembly formed by a plurality of battery cells. The lid body has insulating structure closing the opening of the box body. The duct is provided at least between the box body and the lid body, and configured to allow fluid to flow through the duct. That is, in the present invention, the duct is provided, and the fluid is taken from the outside into the duct, the fluid flows through the duct, and the fluid is discharged to the outside from the duct. The outside herein means the outside of the secondary battery.

Firstly, in the case where the load on the electric power system is low, e.g., in spring season and in autumn season, and for example, at the time of leveling power generation such as wind force power generation, since the electric discharge time period is short, in conventional approaches, occasionally, the amount of heat generated in the NaS battery dropped below the heat loss of the heat insulating container. In this case, the charging/discharging efficiency may be lowered undesirably. However, in this secondary battery, since both of the box body and the lid body have insulation structure, heat accumulated in the box body can be utilized. Even if heater electrical energy is used, energy consumption is small, and degradation in the charging/discharging efficiency can be suppressed.

On the other hand, in the case where the load on the electric power system is high, e.g., in summer season or in winter season, since the electric discharge output is high or the electric discharge time period is long, the amount of heat generated in the NaS battery may exceed the heat loss of the secondary battery undesirably. In particular, in the secondary battery, since both of the box body and the lid body have insulation structure with high heat insulation performance, the internal temperature of the box body may be increased excessively by the heat accumulated in the box body. However, this secondary battery has the duct provided at least between the box body and the lid body for allowing fluid to flow through the duct. Therefore, the cooled fluid from the outside of the secondary battery flows through the duct in the secondary battery, and absorbs the heat. Further, the hot fluid is released to the outside of the secondary battery, and the heat in the box body is released to the outside of the box body. That is, the heat in the box body is released. Therefore, even in the case where the container has high heat insulating property like a container including a box body and a lid body both having vacuum heat insulating structure, the inside of the box body is cooled efficiently. Consequently, even if the electric discharge output is high, or electric discharge time period is long, the temperature in the box body can be maintained in a predetermined temperature range, and it becomes possible to operate the battery assembly in the box body in the optimum operating environment.

[2] In the present invention, the duct may be made of metal, and the secondary battery may include a plate member at least having electrically insulating property provided between the battery assembly and the duct. In this case, even if the duct is made of metal, it is possible to prevent contact between the duct and the battery assembly, and avoid short circuiting among the battery cells.

[3] In the present invention, the duct may be provided under a lower surface of the lid body, and sand may be provided between the duct and the battery assembly. In the structure, thermal conductivity of the sand is low. Since influence of the temperature of the fluid in the duct is absorbed when the heat is transmitted to the battery assembly by conduction of the heat in the height direction, the temperature in the height direction of the battery cells in the battery assembly becomes uniform to a greater extent.

[4] In the present invention, sand may be filled in a gap between the box body and the battery assembly, and between the box body and the lid body, and the duct may include a plurality of fins extending toward at least the battery assembly. The types of the fins include, for example, plain plate fins, corrugated fins (wavy fins), interrupted fins, etc.

In this case, even if the sand is filled between the box body and the lid body, it is possible to enhance conduction of the heat from the battery assembly to the duct, and efficiently lower the temperature in the box body. Further, by attaching the fins, the structural rigidity of the duct becomes high, and it is possible to prevent thermal deformation due to the box body having high temperature and the fluid having low temperature in the channel. Therefore, in the duct, it is possible to maintain the preferred height range over the entire channel of a portion (heat transportation section) for transporting the heat at least generated in the box body together with the fluid.

[5] In the present invention, the duct includes a metal fluid inlet section into which the fluid is supplied, a metal heat transportation section provided downstream of the fluid inlet section, between the lid body and the box body, and configured to transport heat generated at least in the box body together with the fluid, and a metal heat releasing section provided downstream of the heat transportation section, and configured to release the heat to outside together with the fluid.

In the structure, the fluid supplied into the heat transportation section through the fluid inlet section flows between the box body and the lid body. Normally, the heat generated in the battery assembly is transmitted upward (toward the lid body). Therefore, after the heat is transmitted upward, the heat is transported toward the downstream side together with the fluid flowing through the duct, and the heat is released to the outside of the box body through the heat releasing section.

[6] In this case, the lid body may include a ceiling wall and an eaves, and the lid body may be provided to close the opening formed in the upper surface of the box body. The fluid inlet section may be provided along a first side wall of the box body, and oriented between the eaves of the lid body and the first side wall of the box body. The heat transportation section may be provided between the ceiling wall of the lid body and the box body. Further, the heat releasing section may be provided from a position between a second side wall of the box body opposite to the first side wall and the eaves of the lid body along the second side wall of the box body.

The duct can be provided easily between the box body and the lid body both having vacuum heat insulating structure. Moreover, the heat transportation section can be provided at the portion where the heat generated from the battery assembly is transmitted.

[7] Further, at least the first side wall and the second side wall of the box body may be made of metal, the fluid inlet section may be spaced from the first side wall of the box body, and the heat releasing section may be provided in contact with the second side wall of the box body.

Assuming that the fluid inlet section contacts the first side wall, when the heat in the box body is transmitted to the fluid inlet section through the first side wall, and transmitted to the duct, the temperature of the fluid supplied in the duct may be increased, and the fluid may not perform its function as a coolant undesirably. Further, by providing the fluid inlet section spaced from the first side wall of the box body, it is possible to avoid such a disadvantage, and it is possible to supply the fluid which serves as a coolant to the heat transportation section. Further, since the heat releasing section is provided in contact with the second side wall of the box body, the heat transported through the heat transportation section is released from the heat releasing section together with the fluid, and the heat is transmitted to the second side wall of the metal box body, and diffused to the outside. Therefore, heat can be released efficiently.

[8] In this case, buffer material may be interposed between the fluid inlet section and the first side wall of the box body. It is possible to provide the fluid inlet section spaced from the first side wall of the box body.

[9] Preferably, the buffer material may have a heat insulating function. In this case, the buffer material may be heat insulating material. It is possible to prevent the heat in the box body from being transmitted to the fluid inlet section through the first side wall.

[10] The fluid inlet section may include a fluid supply section to which fluid from an external fan is supplied and a fluid guide section configured to guide the fluid supplied to the fluid supply section to the heat transportation section. The fluid in the fluid guide section may be guided in a direction along a surface having a normal line direction in which the fluid is supplied to the fluid supply section, and toward the ceiling wall of the lid body. In the structure, the fluid outputted from the fan can flow toward the heat transportation section smoothly.

[11] In this case, the fluid supply section may include an air chamber, and a channel at an outlet of the air chamber may be narrowed. In the structure, the pressure of the supplied fluid is increased to a constant level in the air chamber, and the fluid can flow at a constant flow rate without any drift (bias) of the flow.

[12] In the present invention, preferably, the temperature of the fluid at the heat releasing section is higher than the temperature of the fluid at the fluid inlet section by +60° C. or less. More preferably, the temperature of the fluid at the heat releasing section is higher than the temperature of the fluid at the fluid inlet section by +40° C. or less. By adopting a small temperature slope between the fluid inlet section and the heat releasing section, it becomes possible to suppress the temperature difference among the battery cells in the box body, and control deterioration of the battery cells to become uniform. Further, since the temperature of the fluid released to the outside and the room temperature are substantially the same, it becomes possible to prevent burns at the time of maintenance operation.

[13] In this case, the width direction of the duct may be the parallel direction of the battery cells, and the length direction of the duct may be the serial direction of the battery cells.

[14] In the present invention, the height of the channel of each of the fluid inlet section, the heat transportation section, and the heat releasing section may be in a range of 10 to 30 mm. In the case where the heights are less than 10 mm, the pressure loss becomes large. Therefore, in the embodiment where a fan, etc. is used as a fluid driving machine for forced cooling, a large driving capability is required for the fan. In this case, the size of the fan, and electrical energy required for driving the fan are increased. Consequently, energy density of the battery and the system efficiency are lowered, and the cost is increased undesirably. In the case where the heights exceed 30 mm, convection flows are generated in the heat transportation section. Consequently, heat is radiated from the box body easily, and the heat insulating performance may be impaired undesirably.

[15] Further, in the present invention, the lid body and the duct may be formed integrally. In the structure, in contrast to the case where the lid body and the duct are provided as separate components, since two metal members overlapped between the lid body and the duct can be integrated into one metal member, the surface area (heat radiation area) of the metal member having good thermal conductivity is reduced. Further, since the number of components or parts is reduced, assembling operation of the secondary battery is simplified. The number of assembling steps is reduced, and reduction of the time required for assembling operation is achieved.

[16] Further, in the present invention, the lid body may include a ceiling wall and an eaves, the lid body may be configured to close the opening formed in the upper surface of the box body, the fluid inlet section may be provided along a first side wall of the box body, and oriented between the eaves of the lid body and the first side wall of the box body, the heat transportation section may be provided between the ceiling wall of the lid body and the box body, spirally from a central portion to a peripheral portion of the box body, and the heat releasing section may be provided from a position between the first side wall of the box body and the eaves of the lid body along the first side wall of the box body.

[17] Alternatively, in the present invention, the lid body may include a ceiling wall and an eaves, and the lid body may be provided to close the opening formed in the upper surface of the box body, the fluid inlet section may include a through hole formed at a central portion of the ceiling wall in the lid body, the heat transportation section may be provided between the ceiling wall of the lid body and the box body, and is configured to transport heat generated at least in the box body together with the fluid supplied through the through hole, and the heat releasing section may at least include a first heat releasing section provided from a position between a first side wall of the box body and the eaves of the lid body along the first side wall of the box body, and a second heat releasing section provided from a position between the second side wall of the box body opposite to the first side wall and the eaves of the lid body along the second side wall of the box body.

[18] The lid body may include a ceiling wall and an eaves, and the lid body may be configured to close the opening formed in the upper surface of the box body, the fluid inlet section may include a first through hole formed in one side wall of the eaves of the lid body, the heat transportation section may be provided between the ceiling wall of the lid body and the box body and transport the heat generated at least in the box body toward the heat releasing section together with the fluid supplied through the first through hole, and the heat releasing section may include a second through hole formed in another side wall opposite to the one side wall of the eaves in the lid body.

[19] In the present invention, the secondary battery may include a heater provided in the box body, and heat insulating material provided between the duct and the box body, the heat insulating material being narrower than an opening area of the box body. The box body may include a first side wall and a second side wall opposite to each other, and the heat insulating material may be provided adjacent to the first side wall of the box body where the fluid is supplied into the box body by the duct.

If the cooled fluid is supplied to the duct, since the temperature of the fluid is low, a large amount of heat is taken away depending on the temperature difference. Consequently, in the box body, an area around the first side wall as the fluid inlet side is cooled, and the temperature distribution in the box body may be degraded undesirably. In this case, the heater is energized. Since the fluid is supplied, and the heater is energized, the system efficiency may be degraded undesirably.

In this regard, in the case where the inlet side of the fluid is adjacent to the first side wall, by providing heat insulating material between the duct and the box body, it becomes possible to decrease the temperature of the area around the first side wall. Consequently, even in the middle of supplying the fluid, it becomes no longer necessary to energize the heater. Accordingly, since it is possible to suppress degradation of the system efficiency, this structure is more preferable.

In the secondary battery according to the present invention, it is possible to perform optimum operation without changing heat insulating structure of the heat insulating container depending on the level of the load.

BRIEF DESCRIPTION OF DRAWINGS

FIG. 12A is a plan view showing a box body where heat insulating material is provided along each of a first side wall and a second side wall in the third modified embodiment as viewed from above;

FIG. 12B is a plan view showing a box body where heat insulating material is provided along each of first to fourth side walls in the third modified embodiment as viewed from above;

DESCRIPTION OF EMBODIMENTS

Figure 1A:
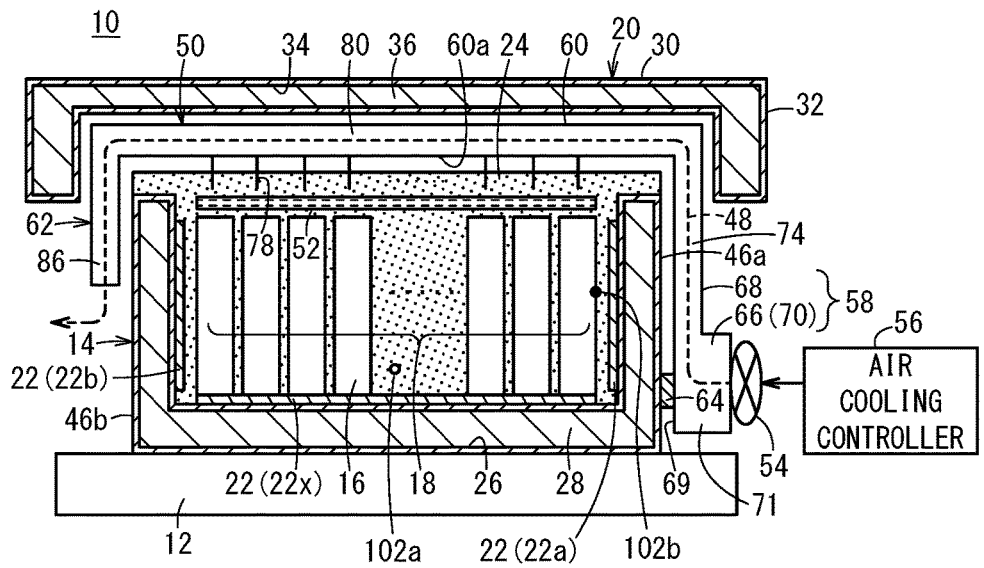
FIG. 1A is a vertical cross sectional view showing structure of a secondary battery according to an embodiment of the present invention with partial omission.
Figure 1B:
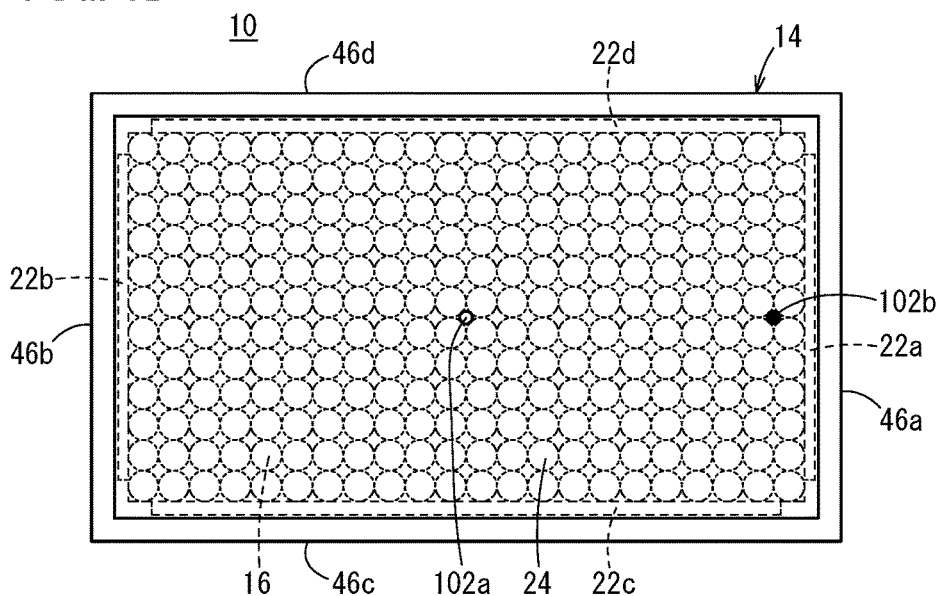
FIG. 1B is a plan view showing a box body of the secondary battery as viewed from above.

Hereinafter, embodiments of a secondary battery according to the present invention applied to a NaS battery will be described with reference to FIGS. 1A to 13B.

As shown in FIGS. 1A to 2B, a secondary battery 10 according to an embodiment of the present invention includes a base frame 12 made of, e.g., steel material, a box body 14 placed, and fixed on the base frame 12, a battery assembly 18 made up of a large number of battery cells 16 accommodated in the box body 14, and a lid body 20 closing an opening of the box body 14. For example, each of the battery cells 16 has a cylindrical shape, and the battery cells 16 are accommodated in the box body 14 such that the axial direction of the battery cells 16 is oriented in the vertical direction.

Further, heaters 22 used for raising the temperature in the box body 14 are provided along a bottom surface and inner wall surfaces of the box body 14, respectively. Further, in order to attend to damages and abnormal heating of the battery cells 16 or leakage of active material, etc., silica sand 24 is filled in a gap between the box body 14 and the battery assembly 18.

For example, the box body 14 has a substantially rectangular parallelepiped shape, and includes four side walls and a bottom wall. An opening is formed in an upper surface of the box body 14. For example, the box body 14 is made of plate material of stainless steel. The box body 14 itself has a box shape including a hollow area 26. The hollow area 26 is a hermetical space which is sealed in an air-tight manner. The hollow area 26 is connectable to the external space by a vacuum valve (not shown). A porous vacuum heat insulating board 28 formed by solidifying glass fiber into a plate shape using adhesive is loaded in the hollow area 26 to achieve vacuum heat insulating structure of the box body 14.

The lid body 20 includes a ceiling wall 30 and an eaves 32 (projecting edge portions), and the lid body 20 is provided to close the opening in the upper surface of the box body 14. In the same manner as in the case of the box body 14, the lid body 20 is made of plate material of stainless steel. The lid body 20 itself has a box shape including a hollow area 34. The hollow area 34 is a hermetical space which is sealed in an air-tight manner. The hollow area 34 is connectable to the external space by a vacuum valve (not shown). A porous vacuum heat insulating board 36 formed by solidifying glass fiber into a plate shape using adhesive is loaded in the hollow area 34 to achieve vacuum heat insulating structure of the lid body 20.

Figure 3:
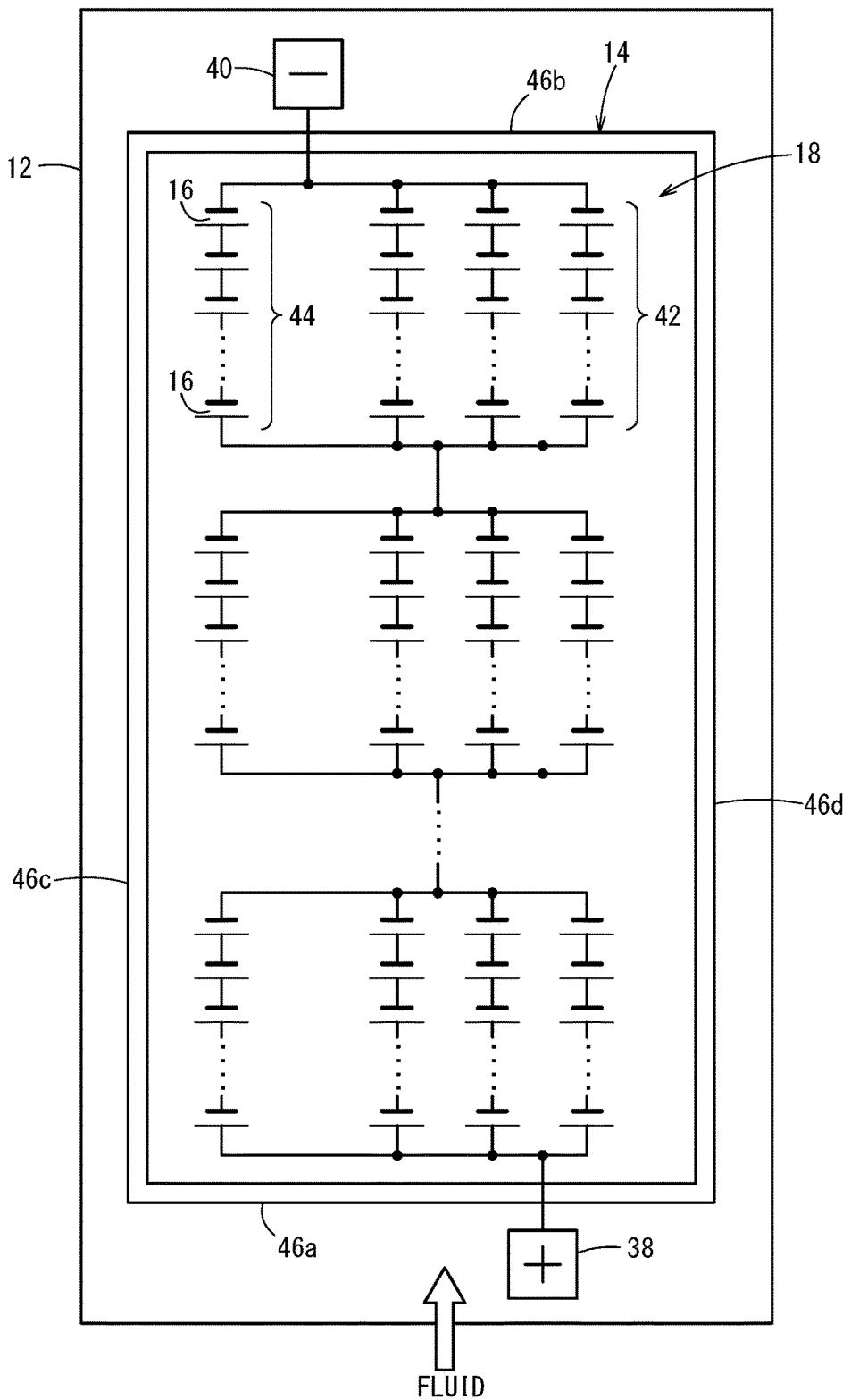
FIG. 3 is a circuit diagram showing a battery assembly accommodated in the box body with partial omission.

As shown in FIG. 3, the battery assembly 18 is formed by connecting two or more blocks 42 in series from a positive electrode external terminal 38 to a negative electrode external terminal 40. Each of the blocks 42 is formed by connecting two or more circuits (strings 44) in parallel, and each of the strings 44 is formed by connecting two or more battery cells 16 in series. The positive electrode external terminal 38 extends to the outside through a first side wall 46a of the box body 14, and the negative electrode external terminal 40 extends to the outside through a second side wall 46b of the box body 14 (side wall opposite to the first side wall 46a). That is, the serial direction of the battery cells 16 is a direction from the first side wall 46a toward the second side wall 46b. The parallel direction of the battery cells 16 is a direction from a third side wall 46c to a fourth side wall 46d (side wall opposite to the third side wall 46c).

The heaters 22 noted above at least include a bottom surface heater 22x provided at the bottom surface of the box body 14, a first side surface heater 22a provided at the inner wall surface of the first side wall 46a, and a second side surface heater 22b provided at the inner wall surface of the second side wall 46b. It is a matter of course that side surface heaters (third side surface heater 22c and fourth side surface heater 22d) may be provided at the inner wall surface of the third side wall 46c and the inner wall surface of the fourth side wall 46d, respectively.

In order to measure the temperature in the box body 14, a bottom surface temperature sensor 102a (denoted by a white circle in FIGS. 1A and 1B) is provided at the center of the bottom surface of the box body 14, at a position remote from the bottom surface heater 22x by a distance in a range of, e.g., 3 mm to 15 mm. Further, a side surface temperature sensor 102b (denoted by a black circle in FIGS. 1A and 1B) is provided at the center of the inner wall surface of the first side wall 46a in the lateral direction and vertical direction, at a position remote from the first side surface heater 22a by a distance in a range of, e.g., 3 mm to 15 mm. It is a matter of course that the side surface temperature sensor 102b may be provided at the center of the inner wall surface of the second side wall 46b in the lateral direction and vertical direction, at a position remote from the second side surface heater 22b by a distance in a range of, e.g., 3 mm to 15 mm.

Figure 5:
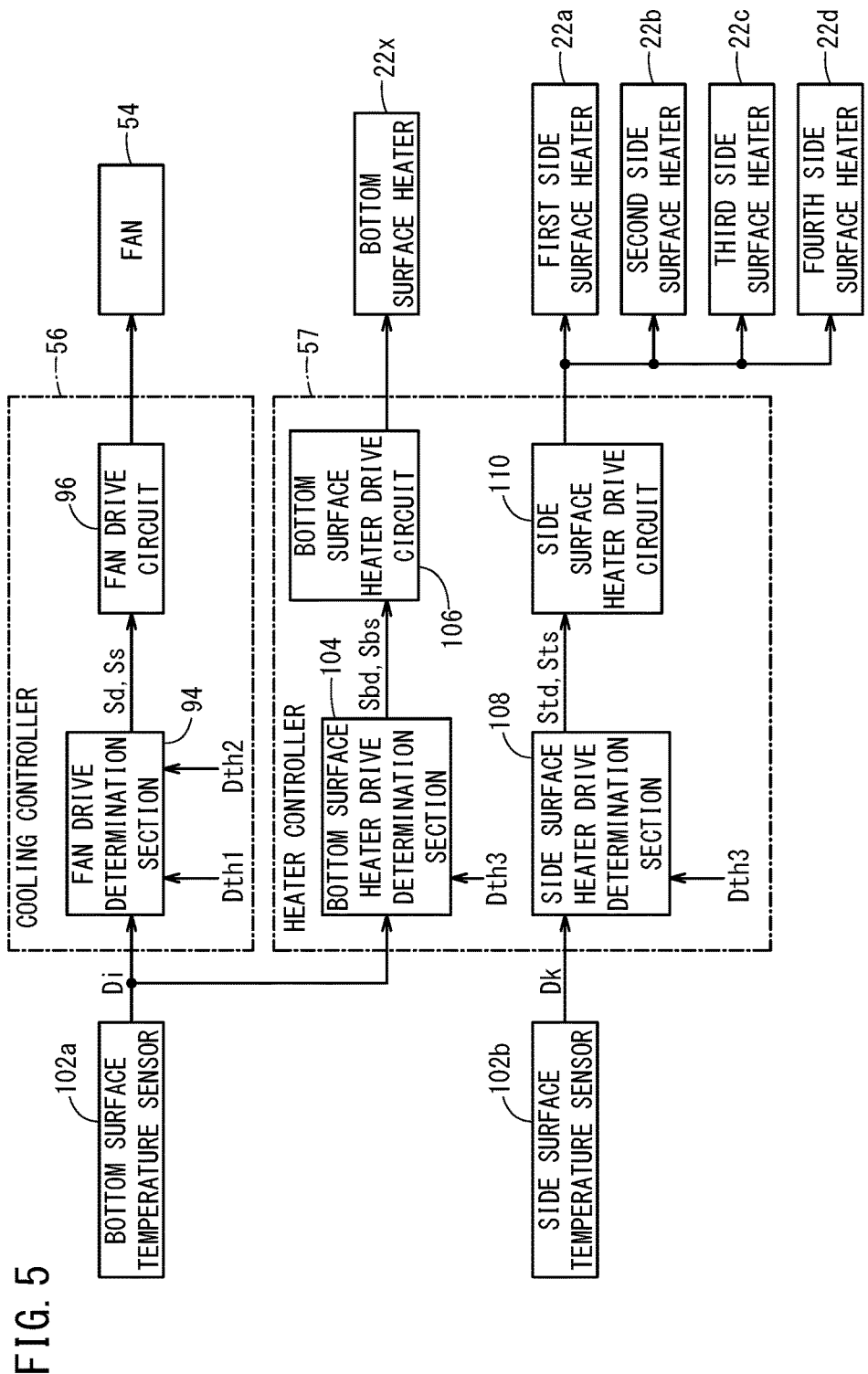
FIG. 5 is a block diagram showing an example of a cooling controller and a heater controller.

Further, as shown in FIGS. 1A to 2B, the secondary battery 10 includes a metal duct 50, a plate member 52, a fan 54, and a cooling controller 56, and a heater controller 57 (see FIG. 5). The metal duct 50 is provided between at least the box body 14 and the lid body 20, and air 48 flows inside the duct 50. The plate member 52 is provided between the battery assembly 18 and the duct 50, and at least has electrically insulating property. The fan 54 is provided outside the box body 14, and sends the air 48 to the duct 50. The cooling controller 56 implements drive control of the fan 54. The heater controller 57 implements energizing control of the heater 22. That is, in the embodiment of the present invention, the duct 50 is provided under the lower surface of the lid body 20, and the silica sand 24 is provided between the duct 50 and the battery assembly 18. In the embodiment of the present invention, as fluid flowing through the duct 50, though the air 48 is used, other gases such as a nitrogen gas or a helium gas may be used. Instead of providing only one fan 54 for the secondary battery 10, a plurality of fans 54 may be provided and connected to the drive circuit, with a view to provide redundancy at the time of occurrence of a failure.

The duct 50 includes a metal air inlet section 58 (fluid inlet section), a metal heat transportation section 60, and a metal heat releasing section 62. The air 48 is supplied into the air inlet section 58. The metal heat transportation section 60 is provided downstream of the air inlet section 58, between the lid body 20 and the box body 14, and transports the heat generated at least in the box body 14 together with the air 48. The heat releasing section 62 is provided downstream of the heat transportation section 60, and releases the heat to the outside together with the air 48.

The air inlet section 58 is provided along the first side wall 46a of the box body 14, and the air inlet section 58 is oriented between the eaves 32 of the lid body 20 and the first side wall 46a of the box body 14. In particular, buffer material 64 (heat insulating material) is interposed between the air inlet section 58 and the first side wall 46a of the box body 14, and the air inlet section 58 is spaced from the first side wall 46a of the box body 14. Preferably, the buffer material 64 has a heat insulating function. In the embodiment, heat insulating material is used as the buffer material 64.

This air inlet section 58 includes an air supply section 66 (fluid supply section) and an air guide section 68 (fluid guide section). The air 48 from the external fan 54 is supplied into the air supply section 66. The air guide section 68 is connected to the air supply section 66, and guides the air 48 supplied to the air supply section 66 to the heat transportation section 60. The air 48 in the air guide section 68 is guided in a direction along a surface 69 of the air guide section 68 having a normal line direction in which the air 48 is supplied to the air supply section 66, and toward the ceiling wall 30 of the lid body 20.

Figure 4:
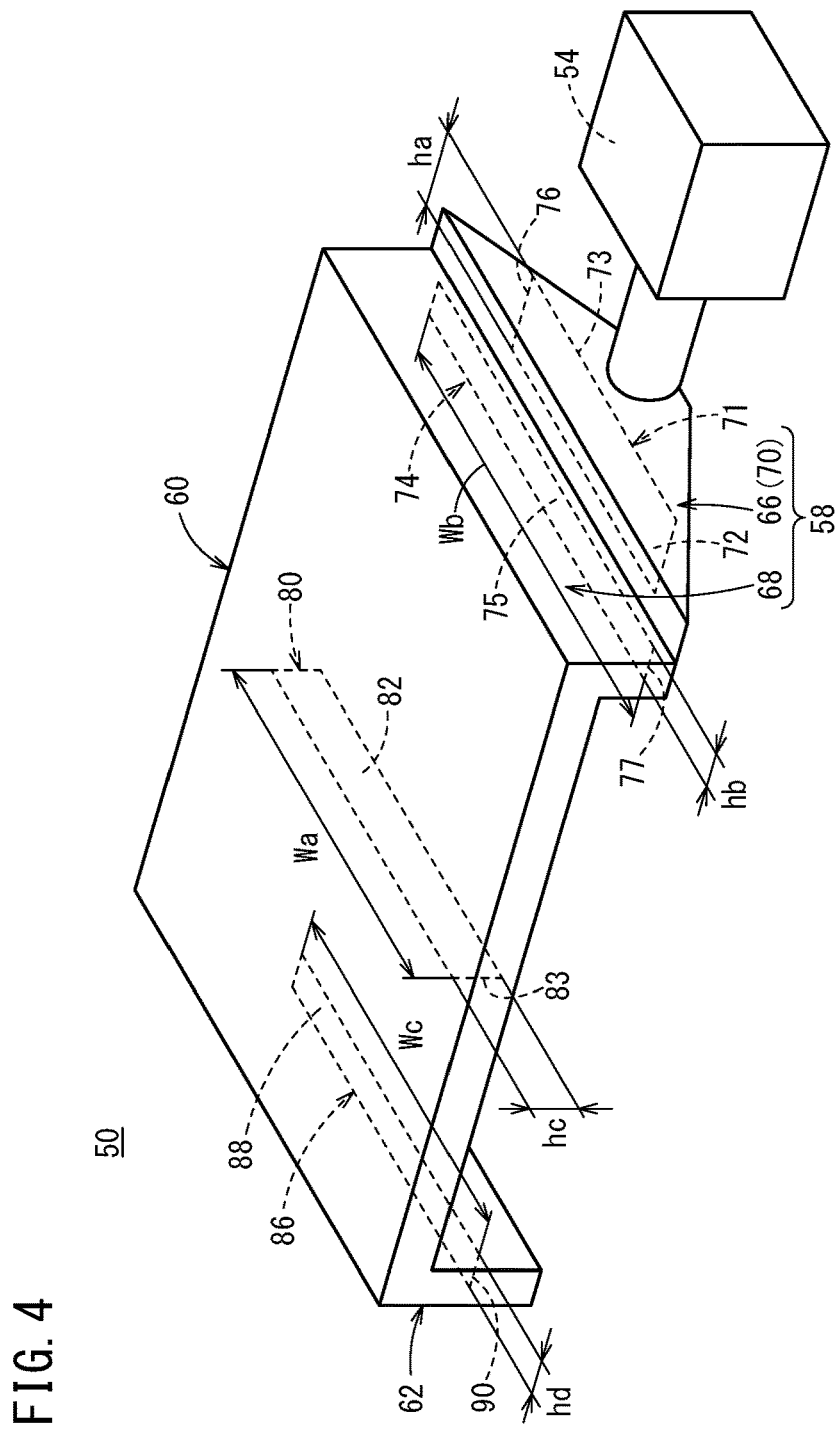
FIG. 4 is a perspective view showing an example of a duct.

The air supply section 66 has an air chamber 70. As shown in FIG. 4, the air chamber 70 has a channel 71, and the channel 71 has a rectangular cross section 72 having a normal line direction which is the main flow direction of the air 48. The surface area of the cross section 72 (long side 73 of the rectangular cross section 72) is increased gradually toward the air guide section 68. The air guide section 68 has a channel 74, and the channel 74 has a rectangular cross section 75 having a normal line direction which is the main flow direction of the air 48. The surface area of the cross section 75 is constant toward the heat transportation section 60. The channel herein means a space (space surrounded by inner wall surfaces) where the air 48 flows. Hereinafter, the term "channel" is used in this meaning. The height ha (length of the short side 76) of the channel 71 of the air chamber 70 and the height hb (length of the short side 77) of the channel 74 of the air guide section 68 are in a range of 10 to 30 mm. In particular, the height ha of the channel 71 of the air chamber 70 is larger than the height hb of the channel 74 of the air guide section 68 (ha>hb).

As shown in FIG. 1A, the heat transportation section 60 is provided between the ceiling wall 30 of the lid body 20 and the box body 14. The shape of a lower surface 60a of the heat transportation section 60 has a rectangular shape which is the same as the shape of the opening of the box body 14. The size of the lower surface 60a is substantially the same as the size of the opening of the box body 14. Further, a plurality of fins 78 are provided at the lower surface 60a of the heat transportation section 60 (surface facing the battery assembly 18 (or the plate member 52)). The fins 78 extend toward the battery assembly 18 (or the plate member 52).

The types of the fins 78 include, for example, plain plate fins, corrugated fins (wavy fins), interrupted fins, etc. In the case of providing the plurality of fins 78 at the lower surface 60a of the heat transportation section 60, for example, a plurality of plain plate fins or corrugated fins extending in the width direction of the heat transportation section 60 (parallel direction of the battery cells 16) may be arranged in the length direction of the heat transportation section 60 (serial direction of the battery cells 16), and conversely, a plurality of plain plate fins or corrugated fins extending in the length direction of the heat transportation section 60 (serial direction of the battery cells 16) may be arranged in the width direction of the heat transportation section 60 (parallel direction of the battery cells 16). Further, in the case of providing a plurality of interrupted fins, the interrupted fins may be arranged in the length direction of the heat transportation section 60 (serial direction of the battery cells 16) while aligning the direction of the plate surface of each interrupted fin with the width direction of the heat transportation section 60 (parallel direction of the battery cells 16), and vice versa. It is a matter of course that the interrupted fins may be arranged in a state where the direction of the plate surface of each interrupted fin may be oriented randomly. In the case of arranging the fins 78 in the width direction of the heat transportation section 60 (parallel direction of the battery cells 16), one fin 78 is provided for each range of s×1/1 to 1/4 where "s" denotes the number of the battery cells 16 in the serial direction.

As shown in FIG. 4, the heat transportation section 60 has a channel 80, and the channel 80 has a rectangular cross section 82 having a normal line direction which is the main flow direction of the air 48. The surface area of the cross section 82 is constant toward the heat releasing section 62. The height hc (length of the short side 83) of the channel 80 of the heat transportation section 60 is in a range of 10 to 30 mm as in the case of the air guide section 68 described above.

Figure 2B:
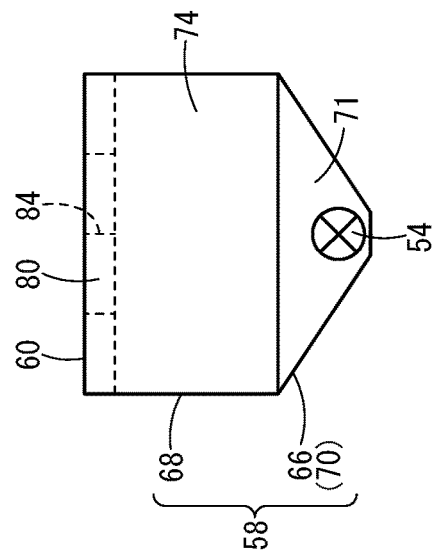
FIG. 2B is a front view showing an example of structure of an air inlet section.

Further, in the channel 80 of the heat transportation section 60, as shown in FIG. 2B, a plurality of support sections 84 for maintaining the shape of the channel 80 are provided. As the support sections 84, for example, plain plate members, corrugated members (wavy members), interrupted members, etc. can be used. In the case of providing a plurality of support sections 84 in the channel 80 of the heat transportation section 60, for example, a plurality of plain plate members or corrugated members extending in the length direction of the heat transportation section 60 (serial direction of the battery cells 16) may be arranged in the width direction of the heat transportation section 60 (parallel direction of the battery cells 16). Further, in the case of providing a plurality of interrupted members, the interrupted members may be arranged in the width direction of the heat transportation section 60 (parallel direction of the battery cells 16) while aligning the direction of the plate surface of each interrupted member with the length direction of the heat transportation section 60 (serial direction of the battery cells 16). It is a matter of course that the interrupted members may be arranged in a state where the direction of the plate surface of each interrupted member may be oriented randomly. Further, as the support sections 84, for example, L-shaped metal members or U-shaped metal members may be used suitably. In the case of providing the support sections 84 in the width direction of the heat transportation section 60 (parallel direction of the battery cells 16), the support sections 84 of the heat transportation section 60 are arranged at interval or 200 to 1000 mm.

Figure 2A:
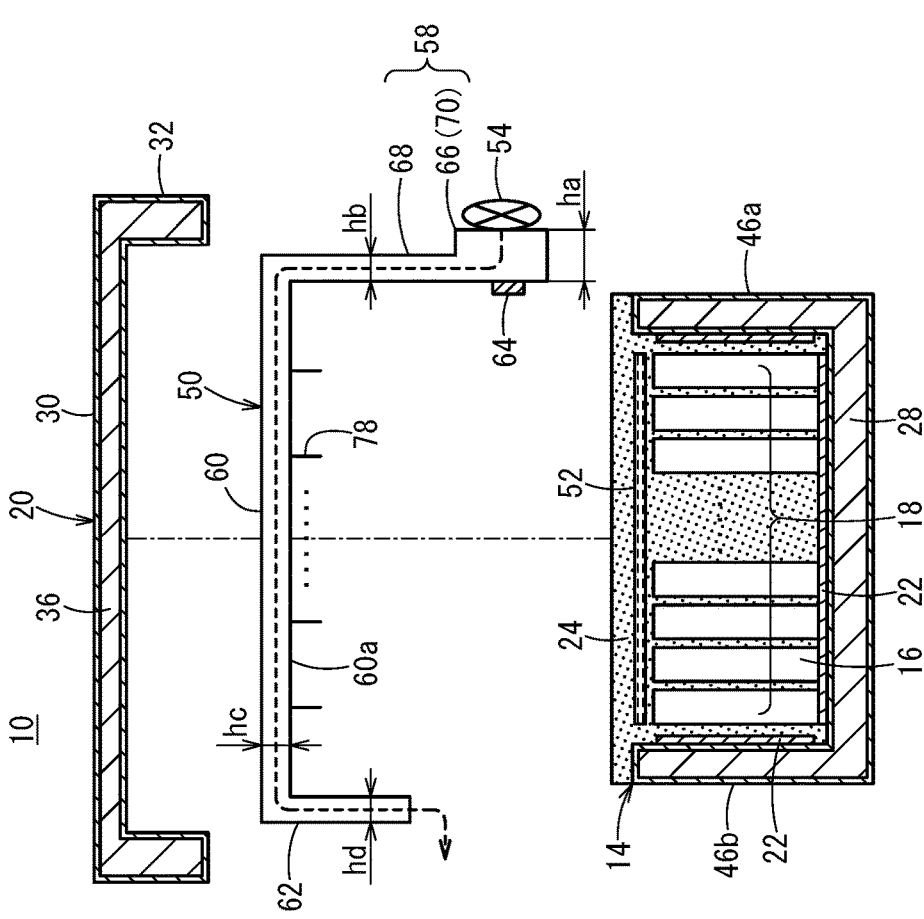
FIG. 2A is an exploded vertical cross sectional view showing structure of a secondary battery according to an embodiment of the present invention.

As shown in FIGS. 1A and 2A, the heat releasing section 62 is provided from a position between the second side wall 46b of the box body 14 and the eaves 32 of the lid body 20 along the second side wall 46b of the box body 14. In particular, the heat releasing section 62 is provided in contact with the second side wall 46b of the box body 14. As shown in FIG. 4, the heat releasing section 62 has a channel 86, and the channel 86 has a rectangular cross section 88 having a normal line direction which is the main flow direction of the air 48. The surface area of the cross section 88 is constant toward the downstream side. The height hd (length of the short side 90) of the channel 86 of the heat releasing section 62 is in a range of 10 to 30 mm. The total length of the heat releasing section 62 is the same as the height of the eaves 32 of the lid body 20. Further, in use, the heat releasing section 62 having the 0 mm length (i.e., the terminal portion of the heat releasing section 62 is cut, and an opening at the cutting plane forms the heat releasing section 62) is preferable as well.

As shown in FIG. 5, the cooling controller 56 includes a fan drive determination section 94 and a fan drive circuit 96. The heater controller 57 includes a bottom surface heater drive determination section 104, a bottom surface heater drive circuit 106, a side surface heater drive determination section 108, and a side surface heater drive circuit 110.

When the temperature Di detected by the bottom surface temperature sensor 102a becomes a predetermined upper limit threshold temperature Dth1 (e.g., 330 to 340° C.) or more, the fan drive determination section 94 outputs a start-up signal Sd to the fan drive circuit 96. When the temperature Di becomes a predetermined lower limit threshold temperature Dth2 or less, the fan drive determination section 94 outputs a stop signal Ss to the fan drive circuit 96. The fan drive circuit 96 drives the fan 54 based on the input of the start-up signal Sd, and supplies the air 48 to the duct 50. Further, the fan drive circuit 96 stops the fan 54 based on the input of the stop signal Ss, and stops supply of the air 48 to the duct 50.

When the temperature Di detected by the bottom surface temperature sensor 102a becomes a predetermined lower limit threshold temperature Dth3 (e.g., 300° C.) or less, the bottom surface heater drive determination section 104 outputs a start-up signal Sbd to the bottom surface heater drive circuit 106. When the temperature Di exceeds the predetermined lower limit threshold temperature Dth3, the bottom surface heater drive determination section 104 outputs a stop signal Sbs to the bottom surface heater drive circuit 106. The bottom surface heater drive circuit 106 energizes the bottom surface heater 22x based on the input of the start-up signal Sbd, and stops energization of the bottom surface heater 22x based on the input of the stop signal Sbs.

When the temperature Dk detected by the side surface temperature sensor 102b becomes the predetermined lower limit threshold temperature Dth3 (e.g., 300° C.) or less, the side surface heater drive determination section 108 outputs a start-up signal Std to the side surface heater drive circuit 110. When the temperature Dk exceeds the predetermined lower limit threshold temperature Dth3, the side surface heater drive determination section 108 outputs a stop signal Sts to the side surface heater drive circuit 110. The side surface heater drive circuit 110 energizes the first side surface heater 22a to the fourth side surface heater 22d based on the input of the start-up signal Std, and stops energization of the first side surface heater 22a to the fourth side surface heater 22d based on the input of the stop signal Sts.

It is a matter of course that the following control method can be adopted suitably as well.

Specifically, in this control method, the secondary battery 10 is equipped with the duct 50, and the air 48 for the duct 50 is regulated according to the required amount of heat radiation. As this control method, for example, the following first to fourth control methods can be adopted.

In the first control method, control is implemented by regulating the wind flow rate based on the change of the rotation number of the fan, or regulating the average wind flow rate based on the ON/OFF duty ratio of the drive time of the fan in order to control the amount of heat radiation based on temperature. For example, using the value of the internal temperature of the secondary battery 10, when the temperature is low, the wind flow rate is decreased, and when the temperature is high, the wind flow rate is increased.

In the second control method, control is implemented by estimating the required amount of heat radiation and regulating the wind flow rate based on the change of the rotation number of the fan, or regulating the average wind flow rate based on the ON/OFF duty ratio of the drive time of the fan. For example, by estimating electric discharge waveform of the battery calculated from load fluctuations or power generation fluctuations estimated beforehand, when the electric discharge output is high or the electric discharge time period is long, the wind flow rate is increased.

In the following third and fourth control methods, control is implemented by estimating degradation in the resistance of the secondary battery 10.

Specifically, in the third control method, the resistance value of the secondary battery 10 is calculated from the voltage value/current value during operation, and the amount of internal heat generation is calculated based on an estimated electric discharge waveform to estimate the required amount of heat radiation for regulating the wind flow rate based on the change of the rotation number of the fan, or regulating the average wind flow rate based on the ON/OFF duty ratio of the drive time of the fan.

In the fourth control method, the resistance value of the secondary battery 10 is calculated from the temperature during operation and the operation cycle, and the amount of internal heat generation is calculated based on an estimated electric discharge waveform to estimate the required amount of heat radiation for regulating the wind flow rate based on the change of the rotation number of the fan, or regulating the average wind flow rate based on the ON/OFF duty ratio of the drive time of the fan.

Next, operation of the secondary battery 10 will be described. Firstly, in the case where the load on the electric power system is low, e.g., in spring season or in autumn season, and for example, at the time of leveling power generation such as wind force power generation, since the electric discharge time period is short, in conventional approaches, occasionally, the amount of heat generated in the NaS battery dropped below the heat loss of the heat insulating container. In this case, as described above, the charging/discharging efficiency may be lowered undesirably. However, in this secondary battery 10, since both of the box body 14 and the lid body 20 have vacuum insulation structure, heat accumulated in the box body 14 can be utilized. Even if heater electrical energy is used, energy consumption is small, and degradation in the charging/discharging efficiency can be suppressed.

On the other hand, in the case where the load on the electric power system is high, e.g., in summer season or in winter season, since the electric discharge output is high or the electric discharge time period is long, the amount of heat generated in the NaS battery may exceed the heat loss of the secondary battery 10 undesirably. In particular, in the secondary battery 10, since both of the box body 14 and the lid body 20 have vacuum insulation structure, the internal temperature of the box body 14 may be increased excessively by the heat accumulated in the box body 14. However, in this secondary battery 10, when the temperature in the box body 14 reaches the upper limit threshold temperature Dth1 or more, the cooling controller 56 drives the fan 54. Thus, the fan 54 is driven to supply the cooled air 48 to the duct 50. Since the air 48 is supplied into the duct 50, the heat in the box body 14 moves to the air 48 in the heat transportation section 60, and the air 48 becomes hot. The hot air 48 is released to the outside of the box body 14 through the heat releasing section 62. That is, the heat in the box body 14 is released. Accordingly, the inside of the box body 14 is cooled forcibly. Even if both of the box body 14 and the lid body 20 have good heat insulating property, the inside of the box body 14 is cooled efficiently. Consequently, Even if the electric discharge output is high, or electric discharge time period is long, the temperature in the box body 14 can be maintained in a temperature range of about 300 to 360° C., and it becomes possible to operate the battery assembly 18 in the box body 14 in the optimum operating environment.

The temperature of the air 48 in the heat releasing section 62 is higher than the temperature of the air 48 in the air inlet section 58 preferably by +60° C. or less, and more preferably by +40° C. or less. By adopting a small temperature slope between the air inlet section 58 and the heat releasing section 62, it becomes possible to suppress the temperature difference in the horizontal direction (serial direction) of the battery cells 16 to 15° C. or less. It becomes possible to reduce the temperature difference among the battery cells 16 resulting from cooling, and enable the battery assembly 18 to exert its performance effectively, and control deterioration of the battery cells 16 to become uniform. Further, since the temperature of the air released to the outside and the room temperature are substantially the same, it becomes possible to prevent burns at the time of maintenance operation.

In particular, since the plate member 52 at least having electrically insulating property is provided between the battery assembly 18 and the heat transportation section 60 of the duct 50, it becomes possible to prevent contact between the metal duct 50 and the battery assembly 18, and avoid short circuiting among the battery cells 16.

In the embodiment of the present invention, the duct 50 is provided under the lower surface of the lid body 20, and the silica sand 24 is provided between the duct 50 and the battery cells 16. In this case, thermal conductivity of the silica sand 24 is low. Since influence of the temperature of the air 48 in the duct 50 is absorbed when the heat is transmitted to the battery assembly 18 by conduction of the heat in the height direction, the temperature in the height direction of the battery cells 16 in the battery assembly 18 becomes uniform to a greater extent.

Further, since a heat insulating layer like the silica sand 24 mentioned above is present between the duct 50 and the upper portion of the battery cells 16, when the air 48 flows into the duct 50 for cooling, the temperature difference among the battery cells 16 in the vertical direction is suppressed to ±15° C. In this case, the ratio of the thermal resistance (R1/R2) is larger than 8 (R1/R2>8) where R1 denotes the thermal resistance of the heat insulating layer such as the silica sand 24, and R2 denotes the thermal resistance of the battery cells 16.

Since the plurality of fins 78 extending toward the battery assembly 18 (plate member 52) are provided at the lower surface 60a of the heat transportation section 60 of the duct 50, even if the silica sand 24 is filled between the box body 14 and the lid body 20, it is possible to enhance conduction of the heat from the battery assembly 18 to the duct 50, and efficiently lower the temperature in the box body 14.

Further, it may be possible that the upper surface of the silica sand 24 becomes uneven due to vibrations of transportation or earthquake, and the surface contact between the duct 50 and the silica sand 24 become non-uniform. However, since the plurality of fins 78 are provided, it is possible to achieve uniform conduction of the heat in the box body 14 in the horizontal direction, and regulate the temperature difference among the battery cells 16 in the battery assembly 18 within ±15° C. Consequently, it becomes possible to reduce the temperature difference among the internal battery cells 16 resulting from cooling, and allows each of the battery cells 16 of the battery assembly 18 to exert its performance. Accordingly, degradation of the battery cells 16 is suppressed.

The duct 50 includes the metal air inlet section 58, the metal heat transportation section 60, and the metal heat releasing section 62. The air is supplied into the air inlet section 58. The metal heat transportation section 60 is provided downstream of the air inlet section 58, between the lid body 20 and the box body 14, and transports the heat generated at least in the box body 14 together with the air 48. The heat releasing section 62 is provided downstream of the heat transportation section 60, and releases the air to the outside together with the air 48. In the structure, the air 48 supplied into the heat transportation section 60 through the air inlet section 58 flows between the box body 14 and the lid body 20. Normally, the heat generated in the battery assembly 18 is transmitted upward (toward the lid body 20). Therefore, after the heat is transmitted upward, the heat is transported toward the downstream side together with the air 48 flowing through the duct 50, and the heat is released to the outside of the box body 14 through the heat releasing section 62.

Further, since the air inlet section 58 is provided along the first side wall 46a of the box body 14 toward a position between the eaves 32 of the lid body 20 and the first side wall 46a of the box body 14, the heat transportation section 60 is provided between the ceiling wall 30 of the lid body 20 and the box body 14, and the heat releasing section 62 is provided from the position between the second side wall 46b of the box body 14 and the eaves 32 of the lid body 20 along the second side wall 46b of the box body 14, the duct 50 can be provided easily between the box body 14 and the lid body 20 both having vacuum heat insulating structure. Moreover, the heat transportation section 60 can be provided at the portion where the heat generated from the battery assembly 18 is transmitted.

In this case, the air inlet section 58 is spaced from the first side wall 46a of the box body 14. Assuming that the air inlet section 58 contacts the first side wall 46a, when the heat in the box body 14 is transmitted to the air inlet section 58 through the first side wall 46a, and transmitted to the duct 50, the temperature of the air 48 may be increased, and the air 48 may not perform its function as coolant undesirably. However, by providing the air inlet section 58 remotely from the first side wall 46a of the box body 14, it is possible to avoid such a disadvantage, and it is possible to supply the air 48 which serves as a coolant to the heat transportation section 60. In particular, by providing the buffer material 64 (heat insulating material) between the air inlet section 58 and the first side wall 46a of the box body 14, it is possible to provide the air inlet section 58 remotely from the first side wall 46a of the box body 14 easily. Further, since the heat releasing section 62 is provided in contact with the second side wall 46b of the box body 14, the heat transported through the heat transportation section 60 is released from the heat releasing section 62 together with the air, and the heat is transmitted to the second side wall 46b of the metal box body 14, and diffused to the outside. Therefore, heat can be released efficiently.

Further, the air inlet section 58 includes the air supply section 66 (air chamber 70) and the air guide section 68. The air from the external fan 54 is supplied into the air supply section 66. The air guide section 68 is connected to the air supply section 66, and guides the air 48 supplied to the air supply section 66 to the heat transportation section 60. The air 48 in the air guide section 68 is guided in the direction along the surface 69 having a normal line direction in which the air 48 is supplied to the air supply section 66, and toward the ceiling wall 30 of the lid body 20. In the structure, the air 48 outputted from the fan 54 can flow toward the heat transportation section 60 smoothly.

In particular, by adopting the narrow channel of the outlet of the air chamber 70 (which also serves as the inlet of the air guide section 68), the air 48 outputted from the fan 54 is stored in the air chamber 70 to increase the pressure at a certain level, and the air 48 can be released from the outlet.

Further, the heat transportation section 60 has the channel 80, and the channel 80 has a rectangular cross section 82 having a normal line direction which is the main flow direction of the air 48. The surface area of the cross section 82 is constant toward the heat releasing section 62. The pressure of the supplied air 48 is increased to a constant level in the air chamber 70, and the air 48 can flow toward the heat releasing section 62 at a constant flow rate without any drift (bias) of the flow. Likewise, the heat releasing section 62 has the channel 86, and the channel 86 has the rectangular cross section 88 having a normal line direction which is the main flow direction of the air 48. The surface area of the cross section 88 is constant toward the downstream side. Therefore, the air supplied at the constant pressure level can flow toward the outside of the duct 50 at a constant flow rate without any drift (bias) of the flow. Further, the air guide section 68 and the heat releasing section 62 are oriented downward in comparison with the heat transportation section 60. In the structure, when the fan 54 is not driven, heat movement due to spontaneous (natural) convection of the air is suppressed, and it becomes possible to maintain the high heat insulation property of the secondary battery 10.

Further, in this secondary battery 10, as shown in FIG. 3, the plurality of battery cells 16 of the battery assembly 18 are connected in series in the main flow direction of the air 48. In this regard, for the purpose of explanation, one of the blocks 42 will be taken into consideration. Among a plurality of strings 44 of the block 42, battery cells 16 adjacent to the first side wall 46a are cooled sufficiently, and battery cells 16 remote from the first side wall 46a are cooled to a lesser degree. Such a difference in the cooling degree is the same in each of the plurality of strings 44 forming one block 42. Therefore, all of the strings 44 are used for charging/discharging, and substantially no variation occurs in the characteristics and degradation degrees, etc. Therefore, in the case of providing the duct 50, preferably, the width direction of the duct 50 is aligned with the parallel direction of the battery cells 16, and the length direction of the duct 50 (main flow direction of the air 48) is aligned with the serial direction of the battery cells 16.

Further, in the secondary battery 10, the heights hb, hc, and hd of the channels of the air guide section 68, the heat transportation section 60, and the heat releasing section 62 are in the range of 10 to 30 mm. In the case where the heights are less than 10 mm, the pressure loss becomes large, and a large driving capability is required for the fan 54. In this case, the size of the fan 54, and electrical energy required for driving the fan 54 are increased. Consequently, energy density of the battery and the system efficiency are lowered, and the cost is increased undesirably. In the case where the heights exceed 30 mm, convection flows are generated in the heat transportation section 60. Consequently, heat is radiated from the box body 14 easily, and the heat insulating performance is degraded. Therefore, it is preferable that the heights hb, hc, and hd of the channels of the air guide section 68, the heat transportation section 60, and the heat releasing section 62 are in the range of 10 to 30 mm.

In the heat transportation section 60 provided in the horizontal direction, the central portion of the channel 80 tends to be bent easily, and the height hc of the channel 80 may not be maintained in the above range of 10 to 30 mm due to the weight of the lid body 20 having vacuum heat insulating structure. Therefore, it is preferable to provide a plurality of support sections 84 in the channel 80 of the heat transportation section 60. In this manner, the height hc of entire channel 80 of the heat transportation section 60 can be maintained in the range of 10 to 30 mm. Further, it becomes possible to support the lid body 20 by the heat transportation section 60. In this case, the support sections 84 in the heat transportation section 60 are arranged in the serial direction of the battery cells 16, and the fins 78 at the lower surface 60a of the heat transportation section 60 are arranged in the parallel direction of the battery cells 16. In this manner, the heat transportation section 60 can be supported by the support sections 84 and the fins 78 in a crisscross pattern. Thus, it is possible to improve the effect of preventing thermal deformation of the duct 50.

Further, preferably, one fin 78 is provided for each range of s×1/1 to 1/4 where "s" denotes the number of the battery cells 16 in the serial direction. In the case where the number of fins 78 is small, the cooling degree may vary among the battery cells 16 in the battery assembly 18. As a result, the temperature difference among the battery cells 16 becomes large, and each of the battery cells 16 cannot exert its performance sufficiently, and some of the battery cells 16 may be deteriorated. If the number of the fins 78 is large, large quantity of material is required for producing the fins 78, and the number of assembling steps is increased disadvantageously.

Further, preferably, the support sections 84 of the heat transportation section 60 may be arranged at interval or 200 to 1000 mm. Preferably, the height hc of the heat transportation section 60 is in a range of 10 to 30 mm. The box body 14 has internal temperature in a range of 300 to 360° C., and the box body 14 is used for long time at this high temperature. Therefore, in consideration of thermal deformation or thermal expansion, it is preferable to increase the number of the support sections 84 as many as possible. However, if the number of the support sections 84 is excessively large, large quantity of material is required and the number of assembling steps is increased undesirably. Preferably, in consideration of thermal deformation, the height hc of the heat transportation section 60 is 20 or more times as large as the change in the tolerable height.

Figure 6:
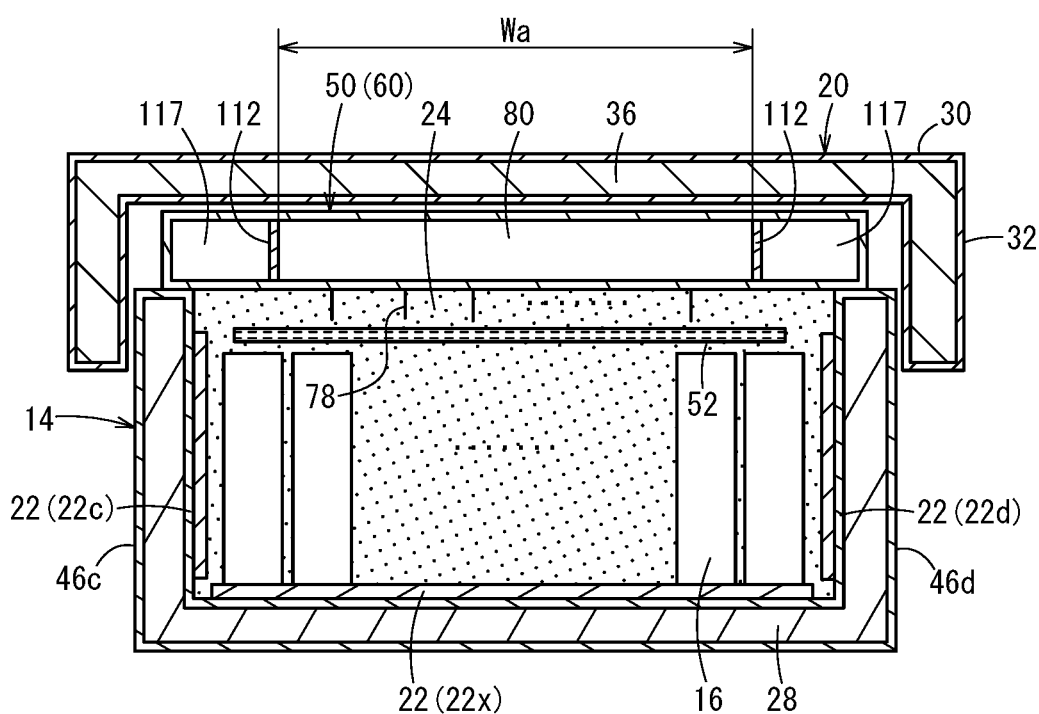
FIG. 6 is a vertical cross sectional view showing a lid body, the box body, and the duct as viewed in a direction in which the air is supplied.

Further, as shown in FIG. 6, at least in the heat transportation section 60 of the duct 50, preferably, the lateral width Wa of the channel 80 as a passage of the air 48 (length in the parallel direction of the battery cells 16) is shorter than the total width in the parallel direction of the battery cells 16, by the distance corresponding to a range of one to two rows of the battery cells 16. In this case, in the heat transportation section 60, partition plates 112 are provided on both of left and right sides as viewed in the direction in which the air is supplied (portions adjacent to the third side wall 46c and the fourth side wall 46d). The air flows along the partition plates 112. In this manner, the lateral width Wa of the channel 80 as a passage of the air 48 becomes shorter than the total width in the parallel direction of the battery cells 16, by the distance corresponding to a range of one to two rows of the battery cells 16. In this regard, in the case where the lateral width Wa of the channel 80 in the heat transportation section 60 is the same as the total width in the parallel direction of the battery cells 16, by heat radiation from the side surfaces (the third side wall 46c and the fourth side wall 46d) of the box body 14 and heat radiation resulting from the air 48 flowing through the duct 50, the battery cells 16 adjacent to the side surfaces of the box body 14 are cooled to a greater extent in comparison with the battery cells 16 arranged at the central portion, the temperature of the battery cells 16 of the battery assembly 18 in the parallel direction may become non-uniform undesirably. Therefore, as described above, the lateral width Wa of the channel 80 of the duct 50 at least in the heat transportation section 60 is shorter than the total width in the parallel direction of the battery cells 16, by the distance corresponding to the range of one to two rows of the battery cells 16. More specifically, the lateral width Wa of the channel 80 is shortened to a degree where both sides of the duct 50 in the parallel direction of the battery cells 16 do not reach the side surfaces (the third side wall 46c and the fourth side wall 46d) of the box body 14. Thus, the battery cells 16 adjacent to the side surfaces of the box body 14 are not cooled greatly, and it becomes possible to achieve the uniform temperature in the parallel direction of the battery cells 16 in the battery assembly 18.

Further, it is preferable to adopt structure where lateral width Wb of the duct 50 from the air inlet section 58 to a position adjacent to the inlet of the heat transportation section 60 (length in the parallel direction of the battery cells 16: see FIG. 4) is shorter than the total width in the parallel direction of the battery cells 16 by the distance corresponding to a range of one to two rows of the battery cells 16. Further, it is preferable to adopt structure where the lateral width We (see FIG. 4) from a position adjacent to the outlet of the heat transportation section 60 to the heat releasing section 62 is shorter than the total width in the parallel direction of the battery cells 16 by the distance corresponding to a range of zero to one row of the battery cells 16. In this manner, it becomes possible to achieve the uniform temperature in the serial direction of the battery cells 16 in the battery assembly 18.

Next, several modified embodiments of the secondary battery 10 according to the embodiment of the present invention will be described with reference to FIGS. 7A to 13B.

Figure 7A:
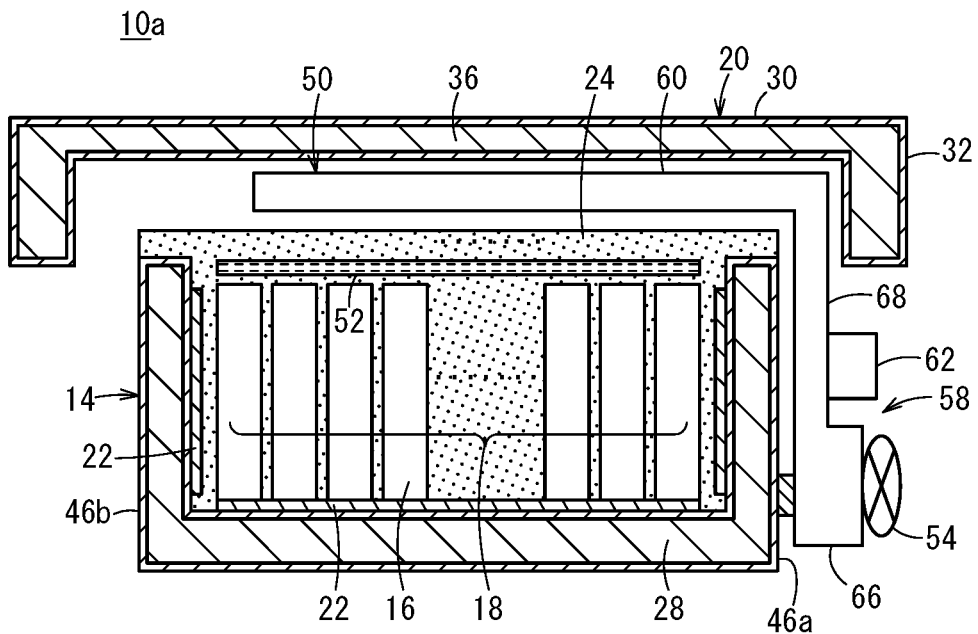
FIG. 7A is a cross sectional view showing a secondary battery according to a first modified embodiment with partial omission.
Figure 7B:
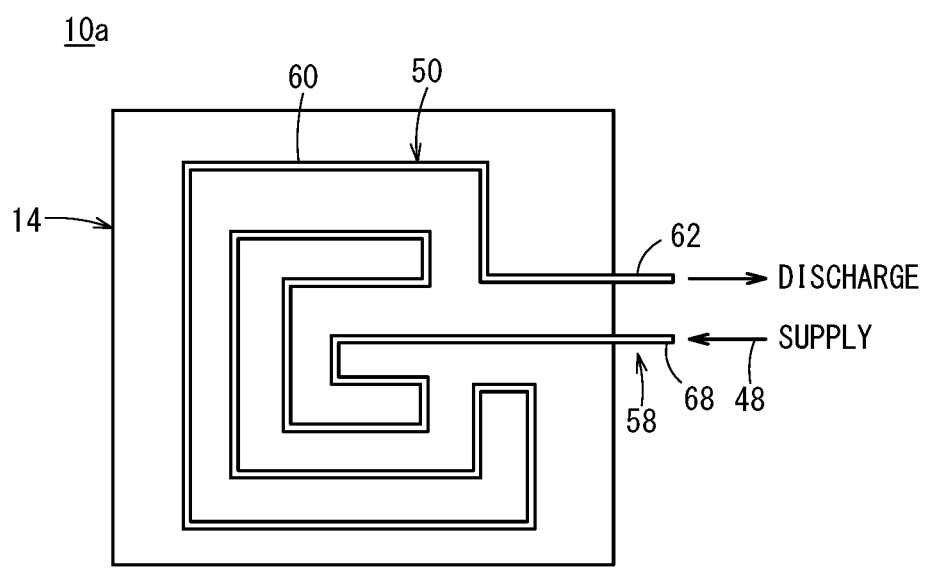
FIG. 7B is a plan view showing a box body and a duct according to the first modified embodiment as viewed from above.

Firstly, as shown in FIGS. 7A and 7B, a secondary battery 10a according to a first modified embodiment has substantially the same structure as the above described secondary battery 10. However, the secondary battery 10a according to the first modified embodiment is different from the secondary battery 10 in the following point.

Specifically, the heat transportation section 60 is provided between the ceiling wall 30 of the lid body 20 and the box body 14, and as shown in FIG. 7B, the heat transportation section 60 is provided spirally from the central portion to the peripheral portion of the box body 14. For example, the channel may have a circular shape or a rectangular shape in cross section. The heat transportation section 60 is provided from a position between the first side wall 46a of the box body 14 and the eaves 32 of the lid body 20 along the first side wall 46a of the box body 14.

By adopting the channel of the heat transportation section 60 in a spiral pattern having a large channel length, for example, in the case of forcibly cooling the plurality of battery cells 16 using one fan 54, even if there is some difference in the channel length among the plurality of battery cells 16, since there is no large difference in the air resistance, it is possible to supply the air equally to each of the battery cells 16. Further, by directly supplying the low temperature air to the center of the module having the high temperature, cooling can be performed intensively, and it become possible to achieve the uniform temperature of the box body 14.

Figure 8:
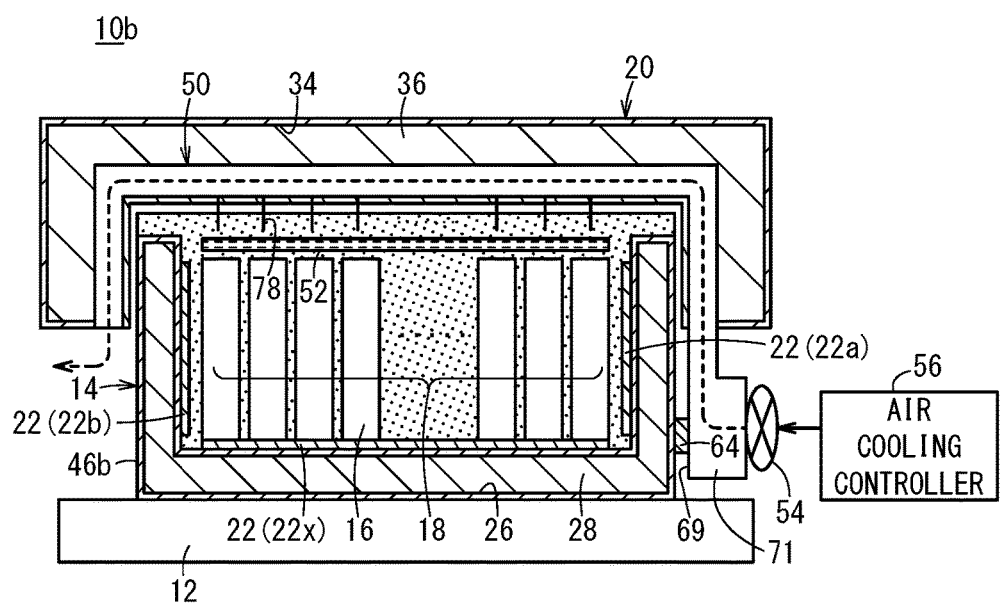
FIG. 8 is a vertical cross sectional view showing a secondary battery according to a second modified embodiment with partial omission.

Next, as shown in FIG. 8, a secondary battery 10b according to a second modified embodiment has substantially the same structure as the above described secondary battery 10. However, the secondary battery 10b according to the second modified embodiment is different from the secondary battery 10 in the following point.

Specifically, the lid body 20 and the duct 50 are formed integrally. FIG. 8 shows an example where the duct 50 is incorporated into the hollow area 34 of the lid body 20 to achieve the integral structure. Contact portions between the lid body 20 and the duct 50 are sealed in an air-tight manner, and vacuum heat insulating structure of the lid body 20 is maintained. The contact portions between the lid body 20 and the duct 50 includes, for example, portions between the lid body 20 and the air guide section 68 of the duct 50, between the lid body 20 and the fins 78 of the duct 50, and between the lid body 20 and the heat releasing section 62 of the duct 50. Other possible methods for achieving the integral structure include welding methods, connecting methods using stud bolts, etc.

By adopting the integral structure of the lid body 20 and the duct 50, in contrast to the case where the lid body 20 and the duct 50 are provided as separate components, since two metal members overlapped between the lid body 20 and the duct 50 can be integrated into one metal member, the surface area of the metal portion having good thermal conductivity (heat radiation area) is reduced, and improvement in the thermal efficiency is achieved. Further, since the number of components or parts is reduced, assembling operation of the secondary battery 10b is simplified. The number of assembling steps is reduced, and reduction of the time required for assembling operation is achieved.

Figure 9A:
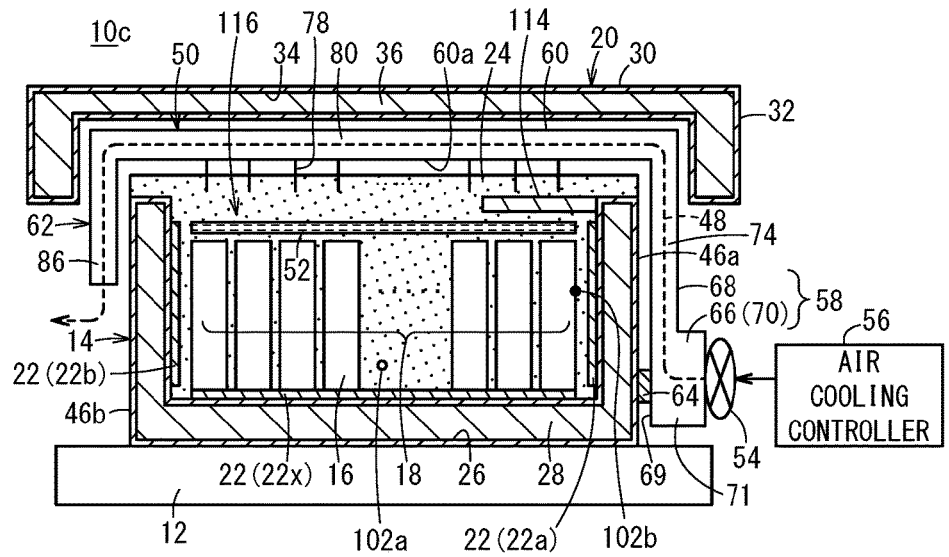
FIG. 9A is a vertical cross sectional view showing a secondary battery according to a third modified embodiment with partial omission.
Figure 9B:
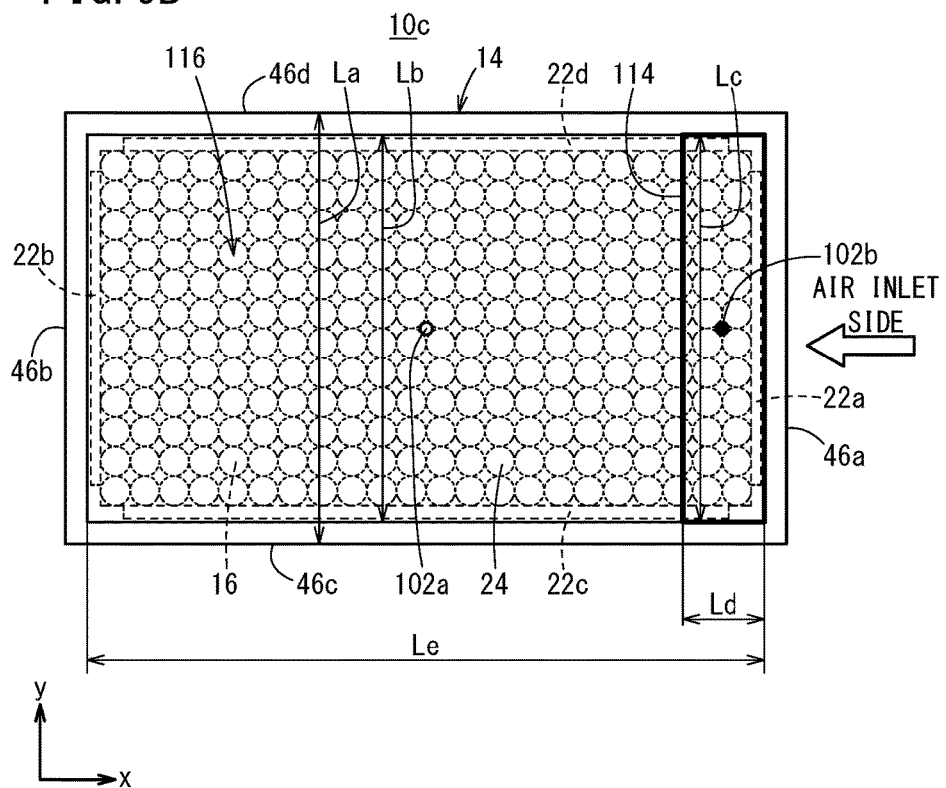
FIG. 9B is a plan view showing a box body of the secondary battery as viewed from above.

Next, as shown in FIGS. 9A and 9B, a secondary battery 10c according to a third modified embodiment has substantially the same structure as the above described secondary battery 10. However, the secondary battery 10c according to the third modified embodiment is different from the secondary battery 10 in that heat insulating material 114 is provided between the box body 14 and the lid body 20.

Figure 10:
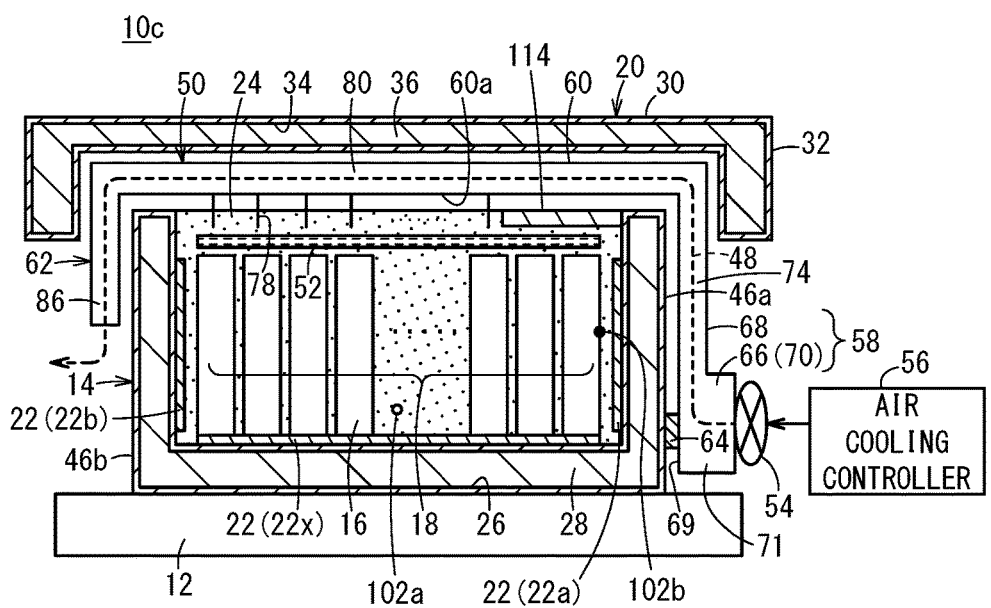
FIG. 10 is a vertical cross sectional view showing a state where partially exposed heat insulating material is provided in the third modified embodiment with partial omission.

In the box body 14, the heat insulating material 114 is provided at a position adjacent to the first side wall 46a as the fluid inlet side. In an example shown in FIG. 9A, the heat insulating material 114 is provided between the silica sand 24 and the duct 50, and in particular, the heat insulating material 114 is embedded in the silica sand 24. It is a matter of course that, as shown in FIG. 10, the heat insulating material 114 may be partially embedded in the silica sand 24.

Next, the size of the heat insulating material 114 will be described with reference to FIG. 9B. As a premise of the explanation, it should be noted that La denotes the distance from the outer surface of the third side wall 46c of the box body 14 to the outer surface of the fourth side wall 46d, and Lb denotes the distance from the inner side surface of the third side wall 46c to the inner side surface of the fourth side wall 46d. Lc denotes the distance in the heat insulating material 114 extending from the third side wall 46c to the fourth side wall 46d (parallel direction y of the battery cells 16), and Ld denotes the distance in the heat insulating material 114 extending from the first side wall 46a to the second side wall 46b (serial direction x of the battery cells 16). Further, Le denotes the distance of the box body 14 from the inner side wall of the first side wall 46a to the inner side surface of the second side wall 46b.

In this regard, the following size relationship is satisfied.

$$Lc \geq La, \text{ or}$$

$$Lb < Lc < La, \text{ or}$$

$$Lc \leq Lb$$

$$Ld < Le/2$$

Gaps 116 are formed where no heat insulating material 114 is provided. Therefore, for example, in the case where the heat insulating material 114 is placed on the silica sand 24, or in the case where the heat insulating material is partially embedded in the silica sand 24, the contents in the box body 14 such as the silica sand 24 are exposed through the gaps 116. As describe above, it is possible to enhance conduction of the heat from the battery assembly 18 to the duct 50 can be achieved through the fins 78 of the duct 50.

It should be noted that the heat insulating material 114 may be placed, or may not be placed on an upper end surface of the box body 14. For example, ceramic fiber, etc. can be used for the heat insulating material 114.

If the cooled air 48 is supplied to the duct 50 by operation of the fan 54, since the temperature of the air 48 is low, a large amount of heat is taken away depending on the temperature difference. In the box body 14, an area around the first side wall 46a as the fluid inlet side is cooled. Consequently, normally, the temperature Dk detected by the side surface temperature sensor 102b becomes the predetermined lower limit threshold temperature Dth3 or less (e.g., 300° C.), and the first side surface heater 22a to the fourth side surface heater 22d are energized. In this case, since the fan 54 is driven by the fan drive circuit 96, and the first side surface heater 22a to the fourth side surface heater 22d are energized by the side surface heater drive circuit 110, the system efficiency may be degraded undesirably.

Thus, the heat insulating material 114 is provided between the box body 14 and the lid body 20 to suppress transmission of the heat of the outer surface of the first side wall 46a to the inside of the box body 14. Consequently, it becomes possible to avoid a situation where the first side surface heater 22a to the fourth side surface heater 22d are energized even during driving of the fan 54 by the fan drive circuit 96. Accordingly, since it is possible to suppress degradation of the system efficiency, this structure is more preferable.

Further, as shown in FIG. 6, in the case where the lateral width Wa of the channel 80 where the air 48 flows in at least the heat transportation section 60 of the duct 50 is shorter than the total width in the parallel direction of the battery cells 16 by the distance corresponding to a range of one to two rows of the battery cells 16, using the partition plates 112, since the air 48 does not flow through spaces 117 outside the partition plates 112, almost no heat is taken away by the air 48 normally. However, in the case where the duct 50 is made of material having good thermal conductivity such as metal, the decrease in the temperature by the air 48 may be transmitted to the inside of the box body 14 through the metal portions outside the partition plates 112. In this case, heat balance is degraded, and the system efficiency is degraded.

Figure 11A:
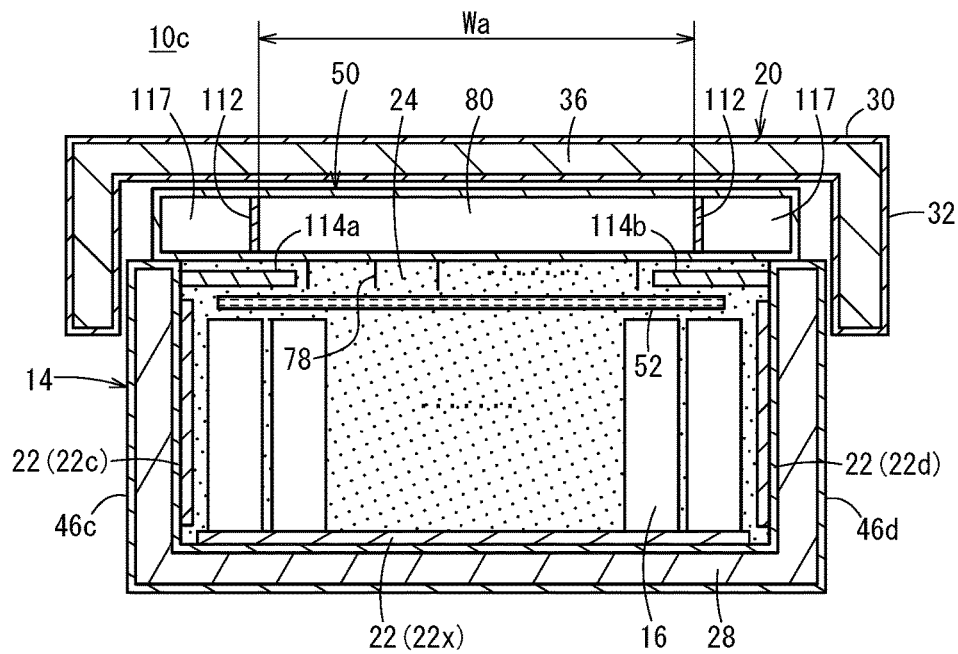
FIG. 11A is a vertical cross sectional view showing a state where heat insulating material is provided along each of a third side wall and a fourth side wall in the third modified embodiment as viewed in a direction in which air is supplied.
Figure 11B:
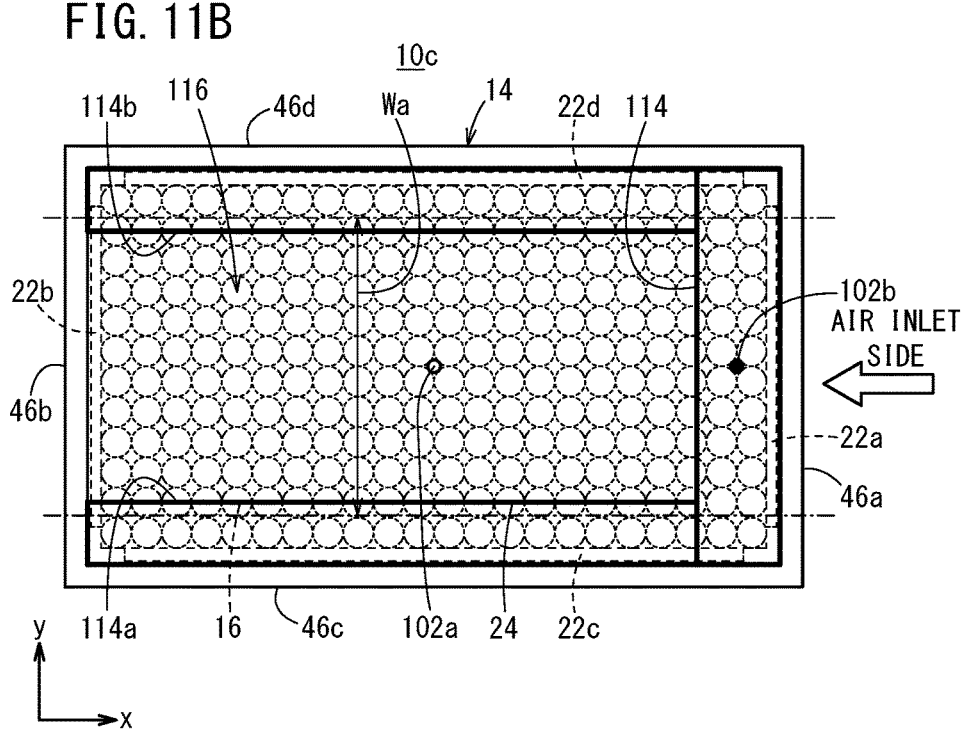
FIG. 11B is a plan view showing a box body of a secondary battery according to the third modified embodiment as viewed from above.

Therefore, as shown in FIGS. 11A and 11B, in addition to the above described heat insulating material 114 (see FIG. 11B), preferably, heat insulating material 114a is provided along the third side wall 46c, and heat insulating material 114b is provided along the fourth side wall 46d. In the structure, since the decrease in the temperature of the air 48 is not transmitted to the inside of the box body 14 through the metal portions outside the partition plates 112, it is possible to suppress degradation of the heat balance.

Further, assuming that the flow rate of the air 48 flowing through the duct 50 is constant, if the distance Le from the inner side surface of the first side wall 46a to the inner side wall surface of the second side wall 46b (see FIGS. 9B and 12A) of the box body 14 is short, the amount of heat transmitted to the air 48 is reduced. In the state where the temperature of the air 48 is low, the air 48 reaches the heat releasing section 62 adjacent to the second side wall 46b. Therefore, in the box body 14, since the area around the second side wall 46b on the fluid output side is cooled, the heat balance is degraded, and the energy efficiency is degraded. Thus, as shown in FIG. 12A, in addition to the above described heat insulating material 114, it is preferable to provide heat insulating material 114c along the second side wall 46b. In the structure, even if the above described distance Le is short, the decrease in the temperature by the air 48 is not transmitted easily to the inside of the box body 14. Therefore, it is possible to suppress degradation of the heat balance.

It is a matter of course that, as shown in FIG. 12B, in addition to the above described heat insulating material 114, the heat insulating materials 114a, 114b, and 114c may be provided along the third side wall 46c, the fourth side wall 46d, and the second side wall 46b. Though the number of heat insulating materials 114 is increased, this structure is effective in suppressing degradation of the heat balance.

Figure 13A:
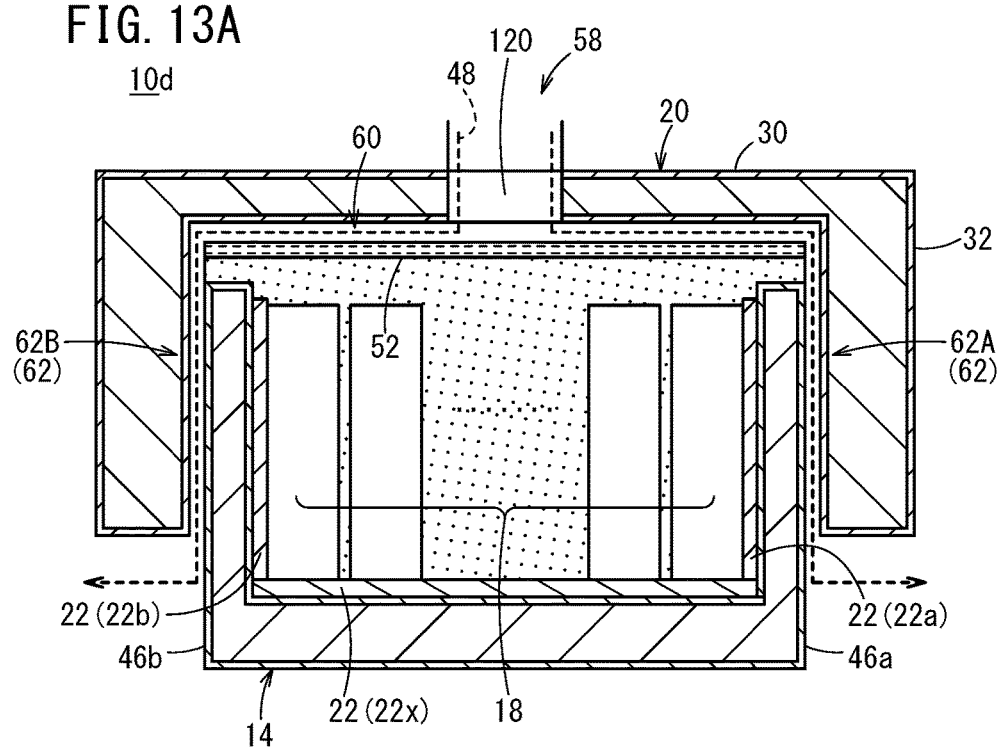
FIG. 13A is a vertical cross sectional view showing a secondary battery according to a fourth modified embodiment with partial omission.

Next, as shown in FIG. 13A, the secondary battery 10d according to a fourth modified embodiment has substantially the same structure as the above described secondary battery 10. However, the secondary battery 10d according to the fourth modified embodiment is different from the secondary battery 10 in the following point.

That is, the air inlet section 58 includes a through hole 120 formed in a central portion of the ceiling wall 30 of the lid body 20. The heat transportation section 60 is provided between the ceiling wall 30 of the lid body 20 and the box body 14, and transports heat generated at least in the box body 14 toward the heat releasing section 62 together with the air 48 supplied through the through hole 120. The heat releasing section 62 includes a first heat releasing section 62A provided from a position between the first side wall 46a of the box body 14 and the eaves 32 of the lid body 20 along the first side wall 46a of the box body 14, and the second heat releasing section 62B provided at a position between the second side wall 46b of the box body 14 and the eaves 32 of the lid body 20 along the second side wall 46b of the box body 14.

Figure 13B:
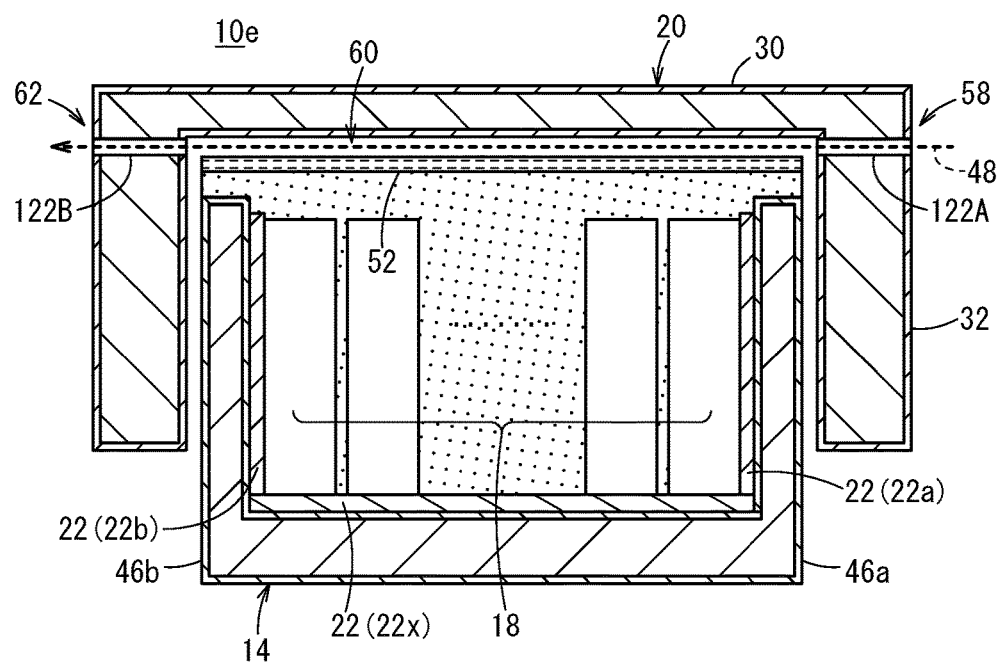
FIG. 13B is a vertical cross sectional view showing a secondary battery according to a fifth modified embodiment with partial omission.

As shown in FIG. 13B, a secondary battery 10e according to a fifth modified embodiment has substantially the same structure as the above described secondary battery 10. However, the secondary battery 10e according to the fifth modified embodiment is different from the secondary battery 10 in the following point.

Specifically, the air inlet section 58 includes a first through hole 122A formed in one side wall of the eaves 32 of the lid body 20. The heat releasing section 62 includes a second through hole 122B formed in the other side wall opposite to one side wall of the eaves 32 of the lid body 20. The heat transportation section 60 is provided between the ceiling wall 30 of the lid body 20 and the box body 14, and transports heat generated at least in the box body 14 toward the second through hole 122B of the heat releasing section 62 together with the air 48 supplied through the first through hole 122A.

The above described fourth and fifth modified embodiments are preferable in the case where the load on the electric power system is high, e.g., in summer season or in winter season, i.e., in the case where the electric discharge output is high or the electric discharge time period is long. However, since the lid body 20 has the through holes, the heat insulating performance is low. Therefore, it is preferable to close the through holes in the case where the load on the electric power system is low, e.g., in spring season or autumn season, and in the case where the electrical discharge time period is short, for example, at the time of leveling power generation such as wind force power generation It is a matter of course that the secondary battery according to the present invention is not limited to the embodiments described above, and various structures can be adopted without deviating the gist of the present invention. For example, in the above-described embodiments, both the box body and the lid body adopt vacuum insulation structure. Alternatively, both the box body and the lid body may adopt atmospheric heat insulating structure. Instead, it is a matter of course that the lid body may adopt atmospheric heat insulating structure and the box body may adopt vacuum insulation structure, or that the lid body may adopt vacuum insulation structure and the box body may adopt atmospheric heat insulating structure.

What is claimed is:

1. A secondary battery comprising:
    a box body having heat insulating structure, an opening being formed in an upper surface of the box body, the box body containing a battery assembly formed by a plurality of battery cells;
    a lid body having heat insulating structure closing the opening of the box body; and
    a duct provided at least between the box body and the lid body, and configured to allow fluid to flow through the duct,
    wherein the duct comprises:
    a metal fluid inlet section into which the fluid is supplied;
    a metal heat transportation section provided downstream of the fluid inlet section, between the lid body and the box body, and configured to transport heat generated at least in the box body together with the fluid; and
    a metal heat releasing section provided downstream of the heat transportation section, and configured to release the heat to outside together with the fluid;
    wherein the lid body includes a ceiling wall and an eaves, and the lid body is configured to close the opening formed in the upper surface of the box body;
    the fluid inlet section is provided along a first side wall of the box body, and oriented between the eaves of the lid body and the first side wall of the box body;
    the heat transportation section is provided between the ceiling wall of the lid body and the box body; and
    the heat releasing section is provided from a position between a second side wall of the box body opposite to the first side wall and the eaves of the lid body along the second side wall of the box body.

2. The secondary battery according to claim 1, wherein the secondary battery further comprises a plate member at least having electrically insulating property provided between the battery assembly and the duct.

3. The secondary battery according to claim 1, wherein the duct is provided under a lower surface of the lid body; and
    sand is provided between the duct and the battery assembly.

4. The secondary battery according to claim 1, wherein sand is filled in a gap between the box body and the battery assembly, and between the box body and the lid body; and
the duct includes a plurality of fins extending toward at least the battery assembly.

5. The secondary battery according to claim 1, wherein at least the first side wall and the second side wall of the box body are made of metal;
the fluid inlet section is spaced from the first side wall of the box body; and
the heat releasing section is provided in contact with the second side wall of the box body.

6. The secondary battery according to claim 5, wherein buffer material is interposed between the fluid inlet section and the first side wall of the box body.

7. The secondary battery according to claim 1, wherein the fluid inlet section comprises a fluid supply section to which fluid from an external fan is supplied, and a fluid guide section configured to guide the fluid supplied to the fluid supply section to the heat transportation section, and
wherein the fluid guide section is configured to guide the fluid to flow in a second direction normal to a first direction in which the fluid flows in the duct.

8. The secondary battery according to claim 7, wherein the fluid supply section includes an air chamber, and further comprises a channel in the metal heat releasing section.

9. The secondary battery according to claim 1, wherein a temperature of the fluid at the heat releasing section is higher than a temperature of the fluid at the fluid inlet section by +60° C. or less.

10. The secondary battery according to claim 1, wherein a width direction of the duct is a parallel direction of the battery cells, and a length direction of the duct is a serial direction of the battery cells.

11. The secondary battery according to claim 1, wherein a height of a channel of each of the fluid inlet section, the heat transportation section, and the heat releasing section is in a range of 10 to 30 mm.

12. The secondary battery according to claim 1, wherein the lid body and the duct are formed integrally.

13. A secondary battery comprising:
a box body having heat insulating structure, an opening being formed in an upper surface of the box body, the box body containing a battery assembly formed by a plurality of battery cells;
a lid body having heat insulating structure closing the opening of the box body; and
a duct provided at least between the box body and the lid body, and configured to allow fluid to flow through the duct,
wherein the duct comprises:
a metal fluid inlet section into which the fluid is supplied;
a metal heat transportation section provided downstream of the fluid inlet section, between the lid body and the box body, and configured to transport heat generated at least in the box body together with the fluid; and
a metal heat releasing section provided downstream of the heat transportation section, and configured to release the heat outside together with the fluid,
wherein the lid body includes a ceiling wall and an eaves, and the lid body is configured to close the opening formed in the upper surface of the box body;
the fluid inlet section is provided along a first side wall of the box body, and oriented between the eaves of the lid body and the first side wall of the box body;
the heat transportation section is provided between the ceiling wall of the lid body and the box body, spirally from a central portion to a peripheral portion of the box body; and
the heat releasing section is provided from a position between the first side wall of the box body and the eaves of the lid body along the first side wall of the box body.

14. A secondary battery comprising:
a box body having heat insulating structure, an opening being formed in an upper surface of the box body, the box body containing a battery assembly formed by a plurality of battery cells;
a lid body having insulating structure closing the opening of the box body; and
a duct provided at least between the box body and the lid body, and configured to allow fluid to flow through the duct,
a heater provided in the box body and heat insulating material provided between the duct and the box body, the heat insulating material being narrower than an opening area of the box body,
wherein the box body includes a first side wall and a second side wall opposite to each other; and
the heat insulating material is provided adjacent to the first side wall of the box body where the fluid is supplied into the box body by the duct.

* * * * *